US011977942B2

United States Patent
Kataoka

(10) Patent No.: US 11,977,942 B2
(45) Date of Patent: May 7, 2024

(54) NONCONTACT STORAGE MEDIUM, MAGNETIC TAPE CARTRIDGE, METHOD FOR OPERATING NONCONTACT STORAGE MEDIUM, AND PROGRAM

(71) Applicant: FUJIFILM CORPORATION, Tokyo (JP)

(72) Inventor: Eiichiro Kataoka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/155,742

(22) Filed: Jan. 18, 2023

(65) Prior Publication Data

US 2023/0161994 A1 May 25, 2023

Related U.S. Application Data

(63) Continuation of application No. PCT/JP2021/023744, filed on Jun. 23, 2021.

(30) Foreign Application Priority Data

Jul. 29, 2020 (JP) .................................. 2020-128581

(51) Int. Cl.
*G06K 19/077* (2006.01)
*G11B 5/78* (2006.01)

(52) U.S. Cl.
CPC .......... *G06K 19/07773* (2013.01); *G11B 5/78* (2013.01)

(58) Field of Classification Search
CPC ........................... G06K 19/07773; G11B 5/78
USPC .......................................................... 235/492
See application file for complete search history.

(56) References Cited

U.S. PATENT DOCUMENTS

| 8,199,433 | B2* | 6/2012 | Stiarwalt ............. G11B 23/042 |
| | | | 360/92.1 |
| 2010/0265607 | A1* | 10/2010 | Thompson ......... G11B 20/1803 |
| 2021/0012804 | A1 | 1/2021 | Nakashio et al. |
| 2021/0027803 | A1 | 1/2021 | Adachi et al. |
| 2021/0098020 | A1* | 4/2021 | Nishida ................ G11B 23/042 |
| 2021/0233567 | A1 | 7/2021 | Tochikubo et al. |

(Continued)

FOREIGN PATENT DOCUMENTS

| JP | 2006-072786 A | 3/2006 |
| JP | 2020-098663 A | 6/2020 |

(Continued)

OTHER PUBLICATIONS

International Search Report issued in International Application No. PCT/JP2021/023744 dated Sep. 28, 2021.

(Continued)

*Primary Examiner* — Ahshik Kim
(74) *Attorney, Agent, or Firm* — SOLARIS Intellectual Property Group, PLLC

(57) ABSTRACT

A noncontact storage medium that is mounted in a magnetic tape cartridge includes an IC chip that is connected to an antenna to be coupled to a communication destination by electromagnetic induction through a magnetic field applied from a communication destination, and performs communication with the communication destination through the magnetic field, and the IC chip corresponds to a plurality of communication standards.

16 Claims, 18 Drawing Sheets

(56) References Cited

U.S. PATENT DOCUMENTS

2021/0241788 A1    8/2021   Adachi et al.
2021/0383836 A1*  12/2021   Anno ................. G11B 5/00813

FOREIGN PATENT DOCUMENTS

WO    2019/198323 A1   10/2019
WO    2020/027331 A1    2/2020

OTHER PUBLICATIONS

Written Opinion of the ISA issued in International Application No. PCT/JP2021/023744 dated Sep. 28, 2021.
English language translation of the following: Office action dated Jul. 11, 2023 from the JPO in a Japanese patent application No. 2020-128581 corresponding to the instant patent application.

* cited by examiner

NONCONTACT STORAGE MEDIUM, MAGNETIC TAPE CARTRIDGE, METHOD FOR OPERATING NONCONTACT STORAGE MEDIUM, AND PROGRAM

CROSS-REFERENCE TO RELATED APPLICATIONS

This application is a continuation application of International Application No. PCT/JP2021/023744, filed Jun. 23, 2021, the disclosure of which is incorporated herein by reference in its entirety. Further, this application claims priority from Japanese Patent Application No. 2020-128581, filed Jul. 29, 2020, the disclosure of which is incorporated herein by reference in its entirety.

BACKGROUND

1. Technical Field

A technique of the present disclosure relates to a noncontact storage medium, a magnetic tape cartridge, a method for operating a noncontact storage medium, and a program.

2. Related Art

WO2019/198323A discloses a magnetic tape cartridge. A magnetic tape is housed in the magnetic tape cartridge. The magnetic tape cartridge is loaded into a tape drive device for use. A head unit is mounted in the tape drive device. The head unit selectively performs write-in and readout of data to and from the magnetic tape.

A cartridge memory is mounted in the magnetic tape cartridge described in WO2019/198323A. Information for managing the magnetic tape is stored in the cartridge memory. The cartridge memory is a noncontact communication medium where an antenna coil, an IC chip, and the like are mounted on a substrate. In WO2019/198323A, a radio frequency identifier (RFID) tag is illustrated as the noncontact communication medium. A reader/writer is mounted in the tape drive device. The reader/writer performs wireless communication with the cartridge memory to perform reading and writing of information from and to the cartridge memory in a noncontact manner.

SUMMARY

An embodiment according to the technique of the present disclosure provides a noncontact storage medium, a magnetic tape cartridge, a method for operating a noncontact communication medium, and a program capable of allowing a noncontact storage medium mounted in a magnetic tape cartridge to perform noncontact communication with a communication destination in a large number of communication standards compared to a case where an IC chip of a noncontact storage medium mounted in a magnetic tape cartridge corresponds to only one communication standard.

A first aspect according to the technique of the present disclosure is a noncontact storage medium that is mounted in a magnetic tape cartridge, the noncontact storage medium comprising an IC chip that is connected to an antenna to be coupled to a communication destination by electromagnetic induction through a magnetic field applied from the communication destination and performs communication with the communication destination through the magnetic field, in which the IC chip corresponds to a plurality of communication standards.

A second aspect according to the technique of the present disclosure is the noncontact storage medium according to the first aspect, in which the communication destination is any of a plurality of communication devices, and the plurality of communication devices have any of a plurality of communication standards.

A third aspect according to the technique of the present disclosure is the noncontact storage medium according to the first aspect or the second aspect, in which any one communication standard among the plurality of communication standards is set in the IC chip as a default communication standard, and in a case where a change instruction to a communication standard different from the default communication standard is given from an outside, the IC chip changes a setting of the communication standard from the default communication standard to a communication standard depending on the change instruction among the plurality of communication standards as a new communication standard and fixes the new communication standard.

A fourth aspect according to the technique of the present disclosure is the noncontact storage medium according to the third aspect, in which the change instruction is a change command for instructing change to the communication standard different from the default communication standard.

A fifth aspect according to the technique of the present disclosure is the noncontact storage medium according to the fourth aspect, in which the outside is the communication destination, and the IC chip performs the communication in the default communication standard to receive the change command from the communication destination.

A sixth aspect according to the technique of the present disclosure is the noncontact storage medium according to the fifth aspect, in which the IC chip is able to communicate with the communication destination in a special communication standard that is a communication standard different from the plurality of communication standards and is used only for changing the setting of the communication standard, and communicates with the communication destination in the special communication standard to receive the change command.

A seventh aspect according to the technique of the present disclosure is the noncontact storage medium according to any one of the fourth aspect to the sixth aspect, in which the IC chip fixes a setting of the new communication standard under a condition that the setting of the communication standard is changed from the default communication standard to the new communication standard.

An eighth aspect according to the technique of the present disclosure is the noncontact storage medium according to any one of the fourth aspect to the sixth aspect, in which the IC chip changes the setting of the communication standard from the default communication standard to the new communication standard and fixes a setting of the new communication standard in a case where a predetermined condition is satisfied.

A ninth aspect according to the technique of the present disclosure is the noncontact storage medium according to the eighth aspect, in which the IC chip has a storage region where a parameter that is able to specify a set communication standard among the plurality of communication standards is stored, and the predetermined condition includes a condition that the parameter in the storage region is updated from the default communication standard to the parameter of the new communication standard.

A tenth aspect according to the technique of the present disclosure is the noncontact storage medium according to the eighth aspect or the ninth aspect, in which the predetermined condition includes a condition that a communication standard change flag indicating that the setting of the communication standard is changed from the default communication standard to the new communication standard is set in the IC chip.

An eleventh aspect according to the technique of the present disclosure is the noncontact storage medium according to any one of the eighth aspect to the tenth aspect, in which the predetermined condition includes a condition that a specific step completion flag indicating that a specific step among a plurality of steps included in a manufacturing process of the magnetic tape cartridge is completed is set in the IC chip.

A twelfth aspect according to the technique of the present disclosure is the noncontact storage medium according to any one of the fourth aspect to the eleventh aspect, in which the change command is a special command that is used only for changing the setting of the communication standard.

A thirteenth aspect according to the technique of the present disclosure is the noncontact storage medium according to any one of the fourth aspect to the twelfth aspect, in which the IC chip has a memory, the change command is a rewrite command for rewriting a storage content of the memory, the storage content includes set communication standard information indicating the set communication standard, and the set communication standard information is rewritten depending on the rewrite command, so that the setting of the communication standard is changed.

A fourteenth aspect according to the technique of the present disclosure is the noncontact storage medium according to any one of the fourth aspect to the thirteenth aspect, in which the IC chip has a hold region for holding communication standard information regarding the plurality of communication standards, and erases information regarding a communication standard other than the new communication standard from the communication standard information in the hold region under a condition that a setting of the new communication standard is fixed.

A fifteenth aspect according to the technique of the present disclosure is a magnetic tape cartridge comprising the noncontact storage medium according to any one of the first aspect to the fourteenth aspect, and a magnetic tape, in which the noncontact storage medium stores information regarding the magnetic tape.

A sixteenth aspect according to the technique of the present disclosure is a method for operating a noncontact storage medium that is mounted in a magnetic tape cartridge, in which the noncontact storage medium includes an IC chip that is connected to an antenna to be coupled to a communication destination by electromagnetic induction through a magnetic field applied from the communication destination, and performs communication with the communication destination through the magnetic field, the IC chip corresponds to a plurality of communication standards, and any one communication standard among the plurality of communication standards is set in the IC chip as a default communication standard, the method comprising, with the IC chip, changing, in a case where a change command to a communication standard different from the default communication standard is given from an outside, a setting of the communication standard from the default communication standard to a communication standard depending on the change command among the plurality of communication standards as a new communication standard; and fixing the new communication standard.

A seventeenth aspect according to the technique of the present disclosure is a program causing a computer, which is applied to a noncontact storage medium mounted in a magnetic tape cartridge, to execute a process, in which the noncontact storage medium includes an IC chip that is connected to an antenna to be coupled to a communication destination by electromagnetic induction through a magnetic field applied from the communication destination, and performs communication with the communication destination through the magnetic field, the IC chip corresponds to a plurality of communication standards, and any one communication standard among the plurality of communication standards is set in the IC chip as a default communication standard, the process comprising, with the IC chip, changing, in a case where a change command to a communication standard different from the default communication standard is given from an outside, a setting of the communication standard from the default communication standard to a communication standard depending on the change command among the plurality of communication standards as a new communication standard; and fixing the new communication standard.

BRIEF DESCRIPTION OF THE DRAWINGS

Exemplary embodiments of the technology of the disclosure will be described in detail based on the following figures, wherein.

DETAILED DESCRIPTION

Figure 1:
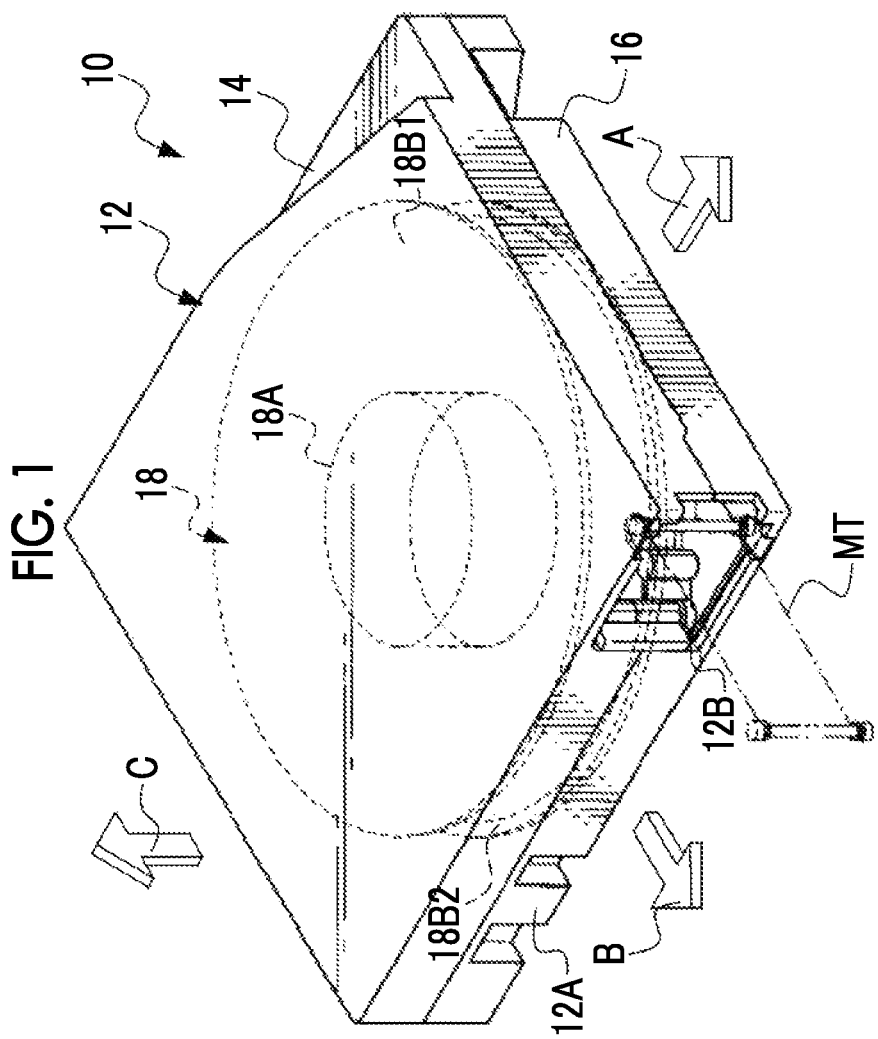
FIG. 1 is a schematic perspective view showing an example of the appearance of a magnetic tape cartridge.

Hereinafter, an example of an embodiment of a noncontact communication medium, a magnetic tape cartridge, a method for operating a noncontact storage medium, and a program according to the technique of the present disclosure will be described referring to the accompanying drawings.

First, terms that are used in the following description will be described.

CPU is an abbreviation for "Central Processing Unit". RAM is an abbreviation for "Random Access Memory". DRAM is an abbreviation for "Dynamic Random Access Memory". SRAM is an abbreviation for "Static Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". USB is an abbreviation for "Universal Serial Bus". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-chip". IC is an abbreviation for "Integrated circuit". RFID is an abbreviation for "Radio Frequency Identifier". LTO is an abbreviation for "Linear Tape-Open". IBM is an abbreviation for "International Business Machines Corporation".

In the following description, for convenience of description, in FIG. 1, a loading direction of a magnetic tape cartridge 10 on a magnetic tape drive 30 (see FIG. 4) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description of the structure, "front" indicates the front side of the magnetic tape cartridge 10.

In the following description, for convenience of description, in FIG. 1, a direction of an arrow B perpendicular to the direction of the arrow A is referred to as a right direction, and a side in the right direction of the magnetic tape cartridge 10 is referred to as a right side of the magnetic tape cartridge 10. In the following description of the structure, "right" indicates the right side of the magnetic tape cartridge 10.

In the following description, for convenience of description, in FIG. 1, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description of the structure, "upper" indicates the upper side of the magnetic tape cartridge 10.

In the following description, for convenience of description, in FIG. 1, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description of the structure, "rear" indicates the rear side of the magnetic tape cartridge 10.

In the following description, for convenience of description, in FIG. 1, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description of the structure, "lower" indicates the lower side of the magnetic tape cartridge 10.

In the following description, although LTO will be described as an example as the standard of the magnetic tape cartridge 10, this is merely an example, and other standards, such as IBM3592, may be employed.

As shown in FIG. 1 as an example, the magnetic tape cartridge 10 has a substantially rectangular shape in plan view, and comprises a box-shaped case 12. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used.

Inside the case 12, a cartridge reel 18 is rotatably housed. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. A magnetic tape MT is wound around an outer peripheral surface of the reel hub 18A, and an end portion in a width direction of the magnetic tape MT is held by the upper flange 18B1 and the lower flange 18B2.

An opening 12B is formed on a front side of a right wall 12A of the case 12. The magnetic tape MT is pulled out from the opening 12B.

Figure 2:
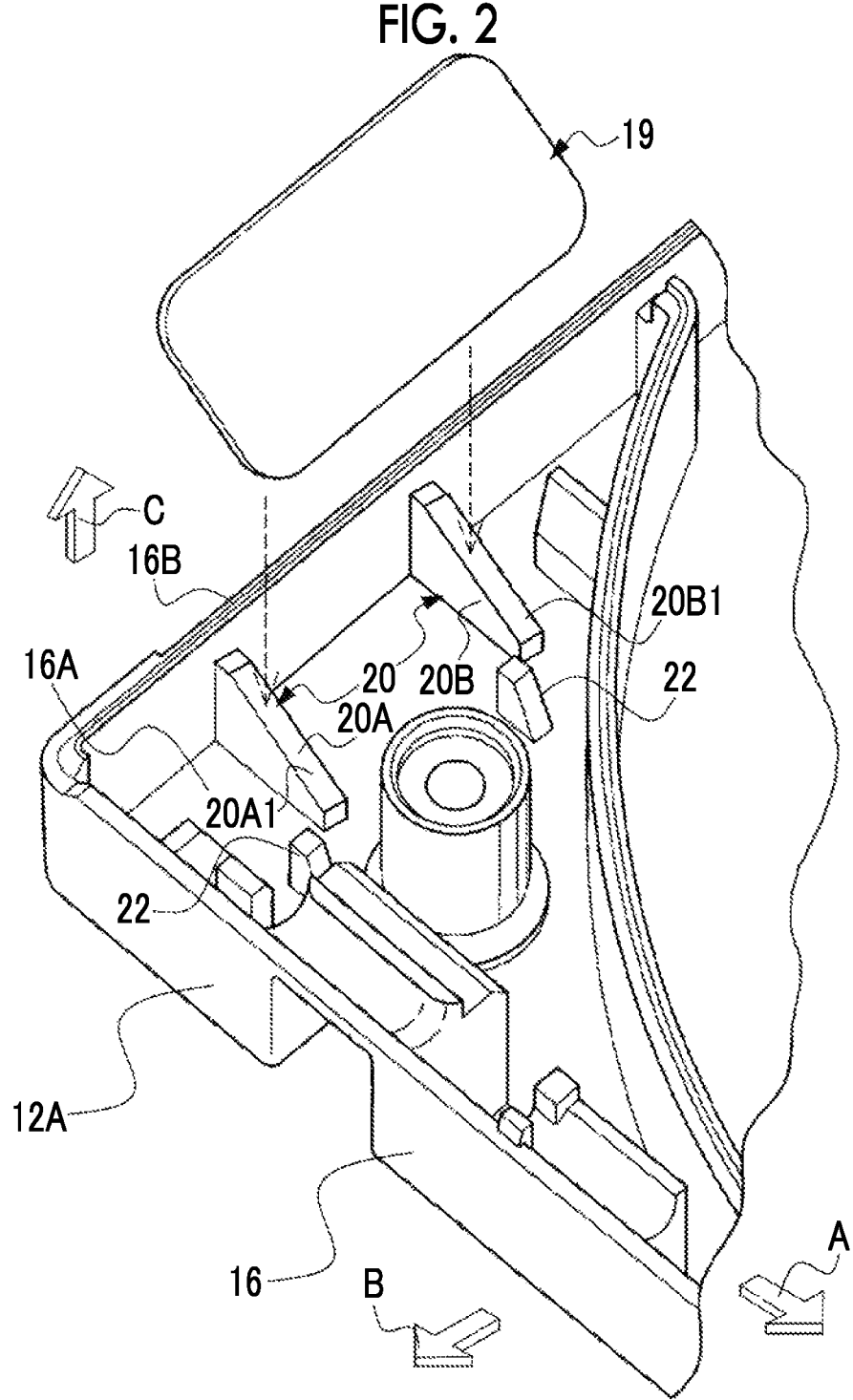
FIG. 2 is a schematic perspective view showing an example of the structure of a rear right end portion inside a lower case of the magnetic tape cartridge.

As shown in FIG. 2 as an example, a cartridge memory 19 is mounted in the magnetic tape cartridge 10. In the example shown in FIG. 2, the cartridge memory 19 is housed in a rear right end portion of the lower case 16. In the present embodiment, a so-called passive type RFID tag is employed as the cartridge memory 19. The cartridge memory 19 is an example of a "noncontact storage medium" according to the technique of the present disclosure.

Information (not shown) regarding the magnetic tape MT is stored in the cartridge memory 19. Information regarding the magnetic tape MT indicates, for example, management information (not shown) for managing the magnetic tape cartridge 10. The management information includes, for example, information regarding the cartridge memory 19, information capable of specifying the magnetic tape cartridge 10, and information indicating a recording capacity of the magnetic tape MT, the outline of information (hereinafter, referred to as "recorded information") recorded on the magnetic tape MT, items of the recorded information, and a recording format of the recorded information.

The cartridge memory 19 performs noncontact communication with an external communication device (not shown). Examples of the external communication device include a reading and writing device that is used in a production process of the magnetic tape cartridge and a reading and writing device (for example, a noncontact reading and writing device 50 shown in FIGS. 4 to 6) that is used in a magnetic tape drive (for example, the magnetic tape drive 30 shown in FIG. 4).

The external communication device performs reading and writing of various kinds of information with respect to the cartridge memory 19 in a noncontact manner. Though details will be described below, the cartridge memory 19 generates power with electromagnetic application to a magnetic field MF (see FIG. 5) from the external communication device. Then, the cartridge memory 19 operates using the generated power and performs transfer of various kinds of information with the external communication device by performing communication with the external communication device through the magnetic field.

As shown in FIG. 2 as an example, a support member 20 is provided on an inner surface of a bottom plate 16A in the rear right end portion of the lower case 16. The support member 20 is a pair of inclined mounts that supports the cartridge memory 19 from below in an inclined state. A pair of inclined mounts is a first inclined mount 20A and a second inclined mount 20B. The first inclined mount 20A and the second inclined mount 20B are disposed at an interval in a right-left direction of the case 12 and are integrated with an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. The second inclined mount 20B has an inclined surface 20B1, and the inclined surface 20B1 is also inclined downward from the inner surface of the rear wall 16B toward the inner surface of the bottom plate 16A.

In front of the support member 20, a pair of position restriction ribs 22 is disposed at an interval in the right-left direction. A pair of position restriction ribs 22 is provided upright on the inner surface of the bottom plate 16A and restricts a position of a lower end portion of the cartridge memory 19 in a state of being disposed on the support member 20.

Figure 3:
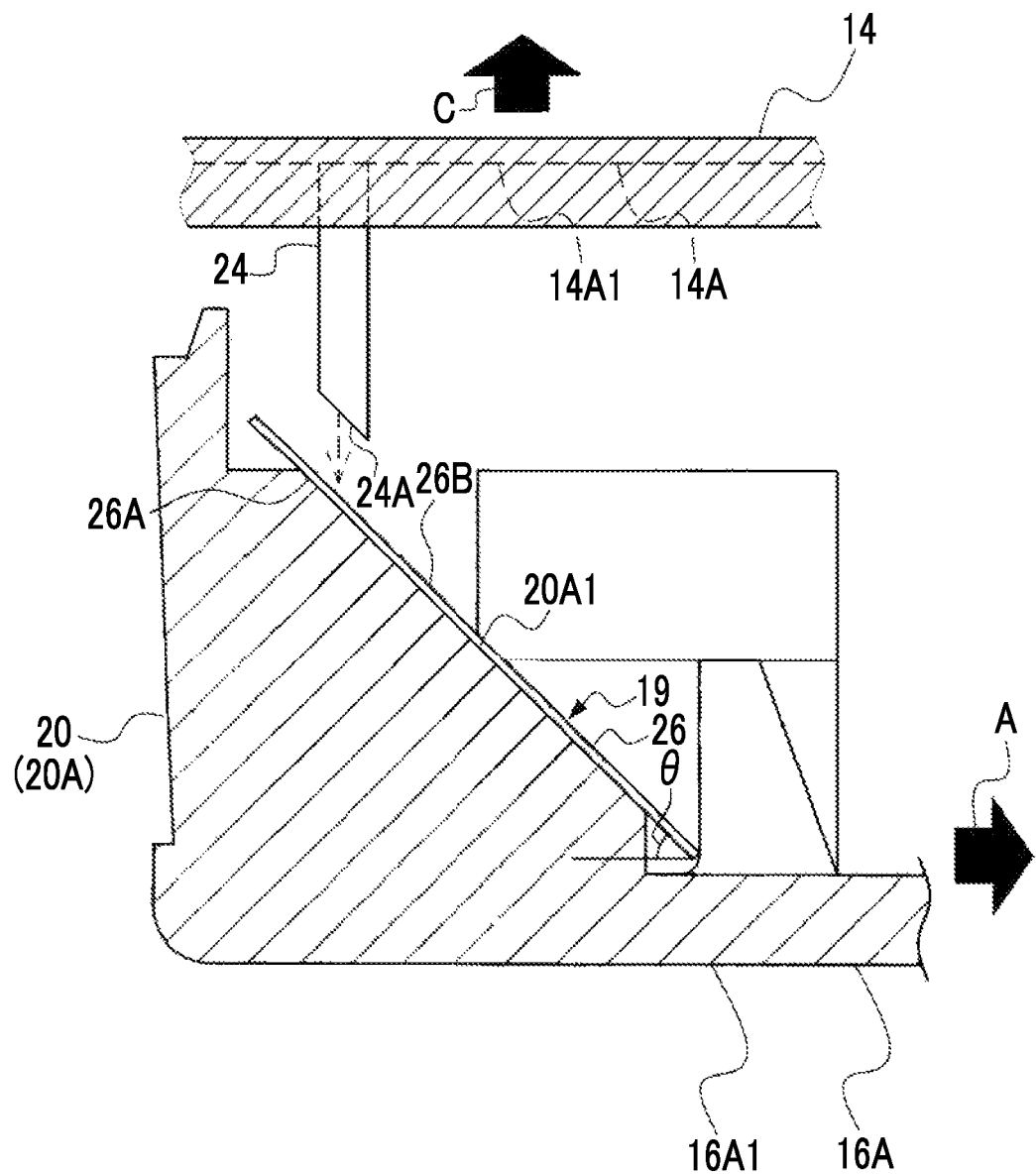
FIG. 3 is a side cross-sectional view showing an example of a support member provided on an inner surface of the lower case of the magnetic tape cartridge.

As shown in FIG. 3 as an example, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a lower side. Here, "parallel" indicates parallel in a meaning including an error that is generally allowed in the technical field to which the technique of the present disclosure belongs, and an error to such an extent not contrary to the spirit and scope of the technique of that the present disclosure, in addition to completely parallel. An inclination angle $\theta$ of the support member 20, that is, an inclination angle of each of the inclined surface 20A1 and the inclined surface 20B1 (see FIG. 2) is 45 degrees with respect to the reference surface 16A1. The inclination angle of 45 degrees is merely an example, and may be in a range of "0 degrees<inclination angle $\theta \leq 45$ degrees".

The cartridge memory 19 comprises a substrate 26. The substrate 26 is placed on the support member 20 such that a back surface 26A of the substrate 26 turns toward a lower side, and the support member 20 supports the back surface 26A of the substrate 26 from below. A part of the back surface 26A of the substrate 26 is in contact with the inclined surface of the support member 20, that is, the inclined surfaces 20A1 and 20B1 (see FIG. 2), and a front surface 26B of the substrate 26 is exposed to an inner surface 14A1 side of a top plate 14A of the upper case 14.

The upper case 14 comprises a plurality of ribs 24. A plurality of ribs 24 are disposed at intervals in the right-left direction of the case 12. A plurality of ribs 24 are provided to protrude downward from the inner surface 14A1 of the top plate 14A of the upper case 14, and a distal end surface 24A of each rib 24 has an inclined surface corresponding to the inclined surfaces 20A1 and 20B1 (see FIG. 2). That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26B side, and the substrate 26 is pinched by the distal end surface 24A of each rib 24 and the inclined surfaces 20A1 and 20B1 (see FIG. 2) of the support member 20. With this, a position in an up-down direction of the cartridge memory 19 is restricted by the ribs 24.

Figure 4:
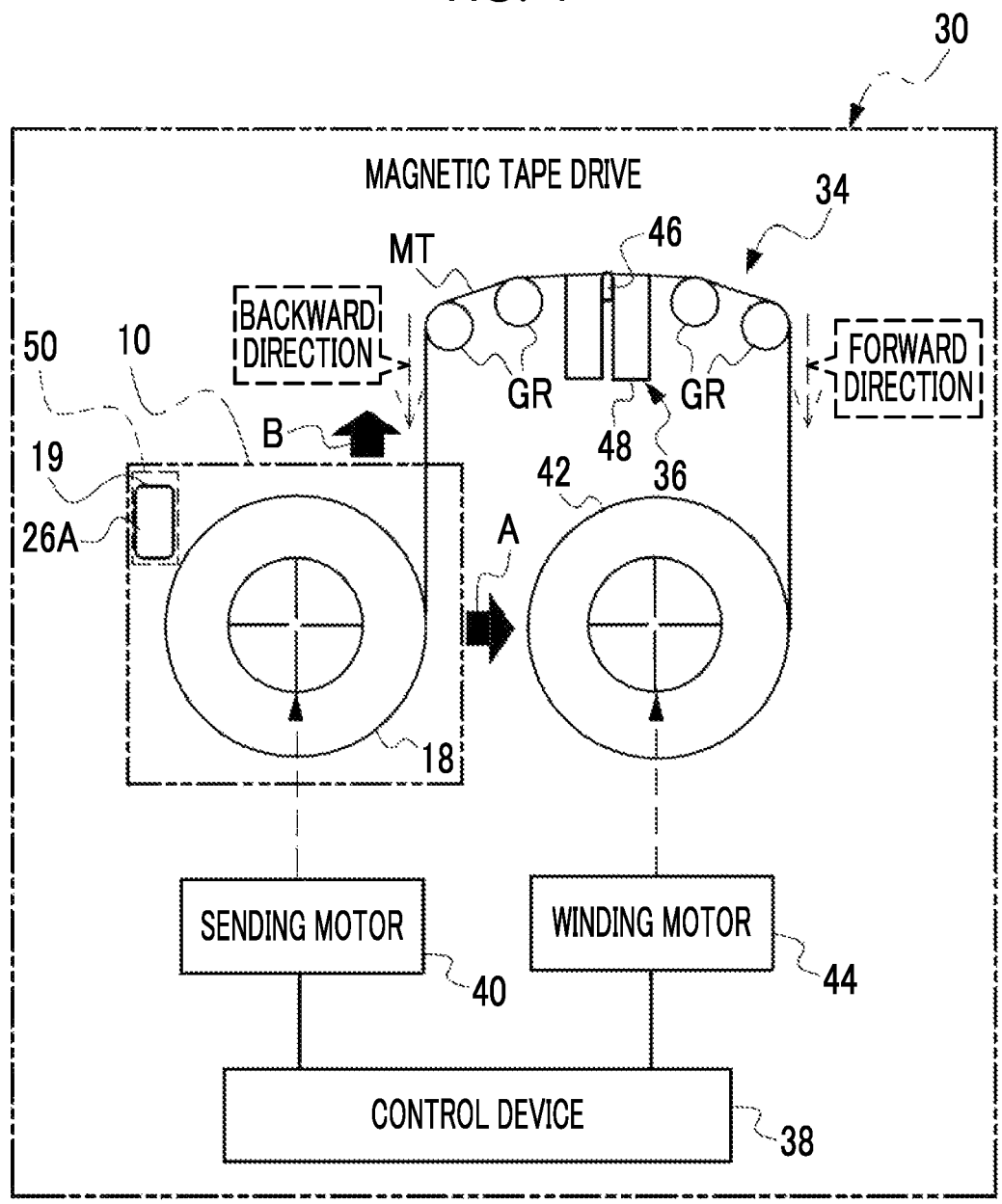
FIG. 4 is a schematic configuration diagram showing an example of the hardware configuration of a magnetic tape drive.

As shown in FIG. 4 as an example, the magnetic tape drive 30 comprises a transport device 34, a reading head 36, and a control device 38. The magnetic tape cartridge 10 is loaded into the magnetic tape drive 30. The magnetic tape drive 30 is a device that pulls out the magnetic tape MT from the magnetic tape cartridge 10 and reads recorded information from the pulled-out magnetic tape MT using the reading head 36 by a linear scanning method. In the present embodiment, in other words, reading of the recorded information indicates reproduction of the recorded information. Here, although reading of the recorded information by the reading head 36 has been illustrated, the technique of the present disclosure is not limited thereto, and data may be written in the magnetic tape MT by a write-in head, data may be written in the magnetic tape MT or data may be read from the magnetic tape MT by a magnetic head.

The control device 38 controls the operation of the entire magnetic tape drive 30. In the present embodiment, although the control device 38 is realized by an ASIC, the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by combining two or more of an ASIC, an FPGA, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38.

The sending motor 40 rotates the cartridge reel 18 in the magnetic tape cartridge 10 under the control of the control device 38. The control device 38 controls the sending motor 40 to control a rotation direction, a rotation speed, rotation torque, and the like of the cartridge reel 18.

In a case where the magnetic tape MT is wound around the winding reel 42, the control device 38 rotates the sending motor 40 such that the magnetic tape MT runs in the forward direction. A rotation speed, rotation torque, and the like of the sending motor 40 are adjusted depending on a speed of the magnetic tape MT wound around the winding reel 42.

The winding motor 44 rotates the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the control device 38 rotates the winding motor 44 such that the magnetic tape MT runs in the forward direction. A rotation speed, rotation torque, and the like of the winding motor 44 are adjusted depending on the speed of the magnetic tape MT wound around the winding reel 42.

The rotation speed, the rotation torque, and the like of each of the sending motor 40 and the winding motor 44 are adjusted in this manner, whereby tension in a predetermined range is applied to the magnetic tape MT. Here, the predetermined range indicates, for example, a range of tension obtained from a computer simulation and/or a test with a real machine as a range of tension in which data can be read from the magnetic tape MT by the reading head 36.

In a case of rewinding the magnetic tape MT to the cartridge reel 18, the control device 38 rotates the sending motor 40 and the winding motor 44 such that the magnetic tape MT runs in the backward direction.

In the present embodiment, although the rotation speed, the rotation torque, and the like of each of the sending motor 40 and the winding motor 44 are controlled such that the tension of the magnetic tape MT is controlled, the technique of the present disclosure is not limited thereto. For example, the tension of the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the reading head 36 between the magnetic tape cartridge 10 and the winding reel 42.

The reading head 36 comprises a reading element 46 and a holder 48. The reading element 46 is held by the holder 48 to come into contact with the magnetic tape MT during running, and reads recorded information from the magnetic tape MT transported by the transport device 34.

The magnetic tape drive 30 comprises the noncontact reading and writing device 50. The noncontact reading and writing device 50 is an example of a "communication destination" according to the technique of the present disclosure. The noncontact reading and writing device 50 is disposed to confront the back surface 26A of the cartridge memory 19 below the magnetic tape drive 30 in a state in which the magnetic tape cartridge 10 is loaded. The state in which the magnetic tape cartridge 10 is loaded into the magnetic tape drive 30 indicates, for example, a state in which the magnetic tape cartridge 10 reaches a position determined in advance as a position where the magnetic tape cartridge 10 starts to read the recorded information with respect to the magnetic tape MT by the reading head 36.

In the example shown in FIG. 4, although an aspect example where the noncontact reading and writing device 50 is mounted on the magnetic tape drive 30 has been shown, the technique of the present disclosure is not limited thereto. The noncontact reading and writing device 50 is also used in a stage where the magnetic tape cartridge 10 is manufactured, a stage where the magnetic tape cartridge 10 is inspected, or a stage where the magnetic tape cartridge 10 is shipped. In this case, for example, a stationary or portable noncontact reading and writing device 50 is used.

Figure 5:
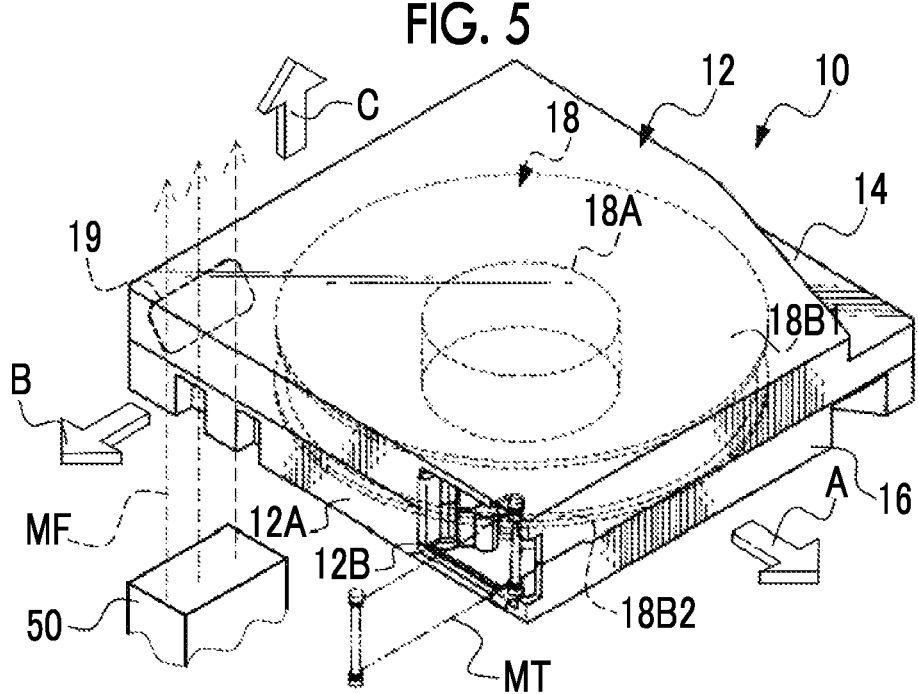
FIG. 5 is a schematic perspective view showing an example of an aspect in which a magnetic field is discharged from a lower side of the magnetic tape cartridge by a noncontact reading and writing device.

As shown in FIG. 5 as an example, the noncontact reading and writing device 50 emits a magnetic field MF from below the magnetic tape cartridge 10 toward the cartridge memory 19. The magnetic field MF passes through the cartridge memory 19.

Figure 6:
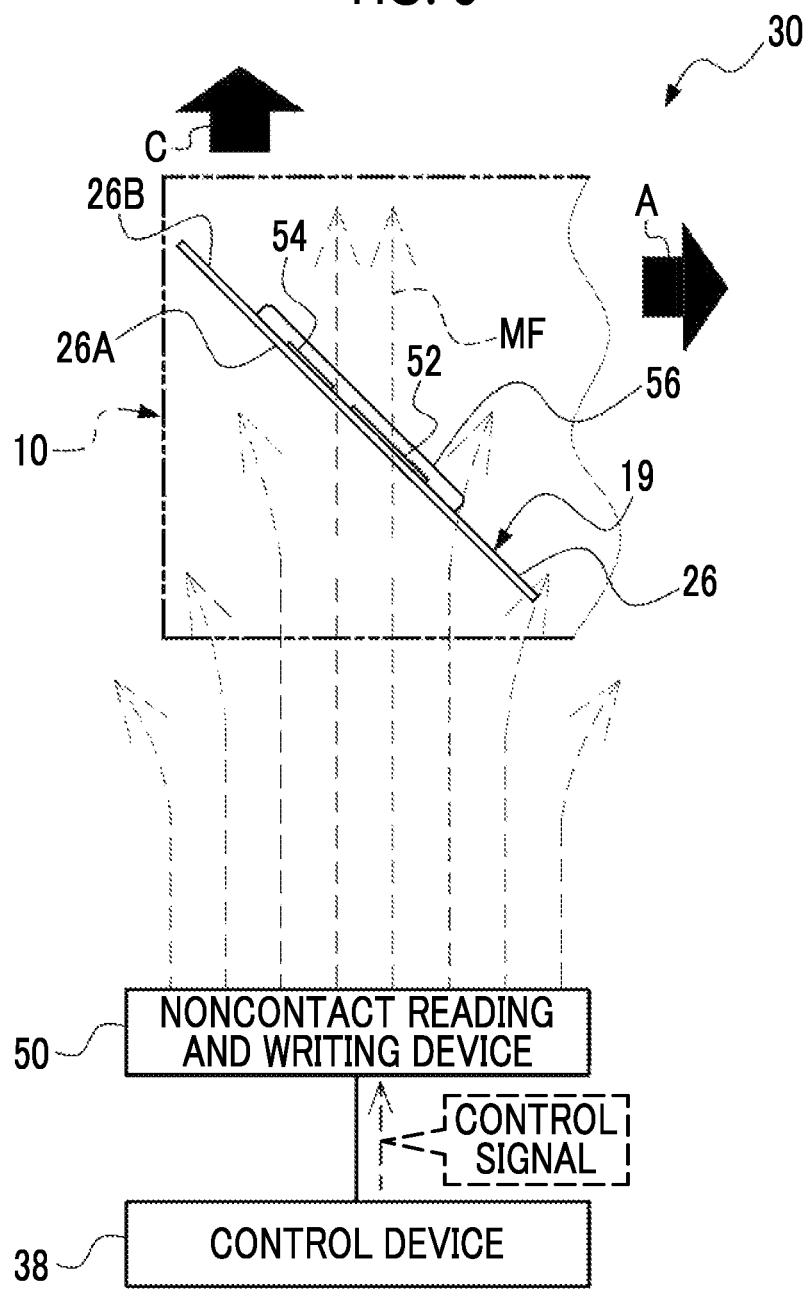
FIG. 6 is a conceptual diagram showing an example of an aspect in which a magnetic field is applied from the noncontact reading and writing device to a cartridge memory in the magnetic tape cartridge.

As shown in FIG. 6 as an example, the noncontact reading and writing device 50 is connected to the control device 38. The control device 38 outputs a control signal for controlling the cartridge memory 19 to the noncontact reading and writing device 50. The noncontact reading and writing device 50 emits the magnetic field MF toward the cartridge memory 19 in response to the control signal input from the control device 38. The magnetic field MF passes through the cartridge memory 19 from the back surface 26A side to the front surface 26B side.

The noncontact reading and writing device 50 performs noncontact communication with the cartridge memory 19 to give a command depending on the control signal to the cartridge memory 19. In more detail, the noncontact reading and writing device 50 spatially transmits a command to the cartridge memory 19 under the control of the control device 38. The command is a signal indicating a command to the cartridge memory 19.

Here, although a form example where the noncontact reading and writing device 50 spatially transmits the command to the cartridge memory 19 under the control of the control device 38 has been described, the technique of the present disclosure is not limited thereto. For example, in a stage where the magnetic tape cartridge 10 is manufactured, a stage where the magnetic tape cartridge 10 is inspected, or a stage where the magnetic tape cartridge 10 is shipped, the noncontact reading and writing device 50 spatially transmits the command to the cartridge memory 19 under the control of a control device different from the control device 38.

In a case where the command is spatially transmitted from the noncontact reading and writing device 50 to the cartridge memory 19, the command depending on an instruction from the control device 38 is included in the magnetic field MF by the noncontact reading and writing device 50. In other words, the command is superimposed on the magnetic field MF by the noncontact reading and writing device 50. That is, the noncontact reading and writing device 50 transmits the command to the cartridge memory 19 through the magnetic field MF under the control of the control device 38.

By the way, as a communication standard that is generally known and is used in wireless communication between a cartridge memory mounted in a magnetic tape cartridge and a noncontact reading and writing device (a device called a reader/writer), there are a plurality of communication standards, such as ISO18092, ISO14443A, ISO14443B, and ISO15693.

Note that, in a case where there are a plurality of communication standards, since a communication standard may be different by product (for example, for each kind of magnetic tape cartridge of the related art), there is a need for mounting an IC chip corresponding to a communication standard on the cartridge memory. In regard to most of components (for example, a substrate, a wire, and a protective agent) other than the IC chip among a plurality of components used in the cartridge memory, while the same kinds of components can be used among the cartridge memories, in a case where the IC chip should be changed by product, manufacturing cost increases.

In view of such a situation, in the magnetic tape cartridge 10 according to the present embodiment, an IC chip 52 is mounted on the cartridge memory 19. Hereinafter, the IC chip 52 and the periphery thereof will be described in detail.

The IC chip 52 and a capacitor 54 are mounted on the front surface 26B of the cartridge memory 19. The IC chip 52 and the capacitor 54 are bonded to the front surface 26B. The IC chip 52 and the capacitor 54 are sealed with a sealing material 56 on the front surface 26B of the cartridge memory 19. Here, as the sealing material 56, ultraviolet curable resin that is cured upon reaction with ultraviolet rays is employed. The ultraviolet curable resin is merely an example, and photocurable resin that is cured upon reaction with light in a wavelength range other than ultraviolet rays may be used as the sealing material 56, thermosetting resin may be used as the sealing material 56, or other adhesives may be used as the sealing material 56.

Figure 7:
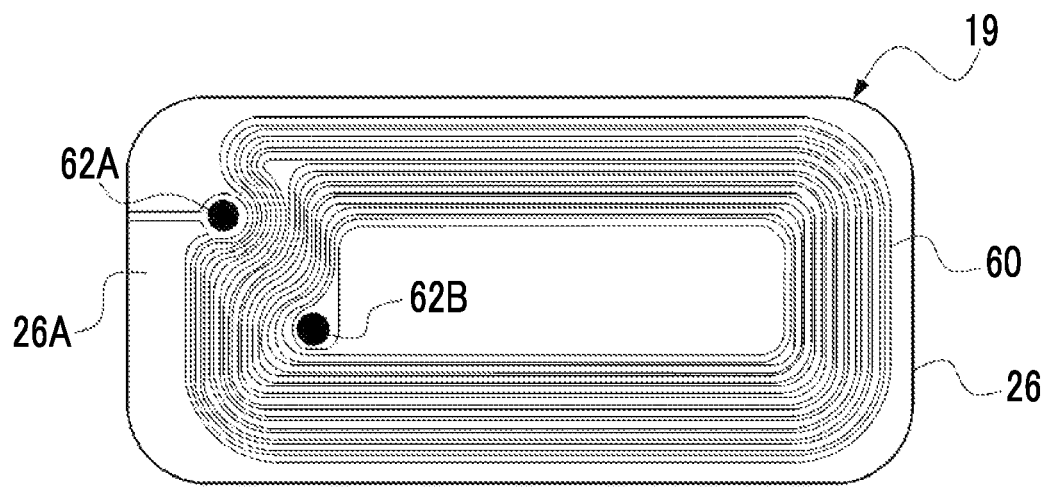
FIG. 7 is a schematic bottom view showing an example of the structure of a back surface of a substrate of the cartridge memory in the magnetic tape cartridge.

As shown in FIG. 7 as an example, a coil 60 is formed in a loop shape on the back surface 26A of the cartridge memory 19. The coil 60 is an example of an "antenna" according to the technique of the present disclosure. Here, as a material of the coil 60, copper foil is employed. The copper foil is merely an example, and for example, other kinds of conductive materials, such as aluminum foil, may be used. The coil 60 induces an induced current with application of the magnetic field MF (see FIGS. 5 and 6) from the noncontact reading and writing device 50.

A first conduction portion 62A and a second conduction portion 62B are provided on the back surface 26A of the cartridge memory 19. The first conduction portion 62A and the second conduction portion 62B have solders and electrically connect both end portions of the coil 60 to the IC chip 52 (see FIGS. 6 and 8) and the capacitor 54 (see FIGS. 6 and 8) on the front surface 26B.

Figure 8:
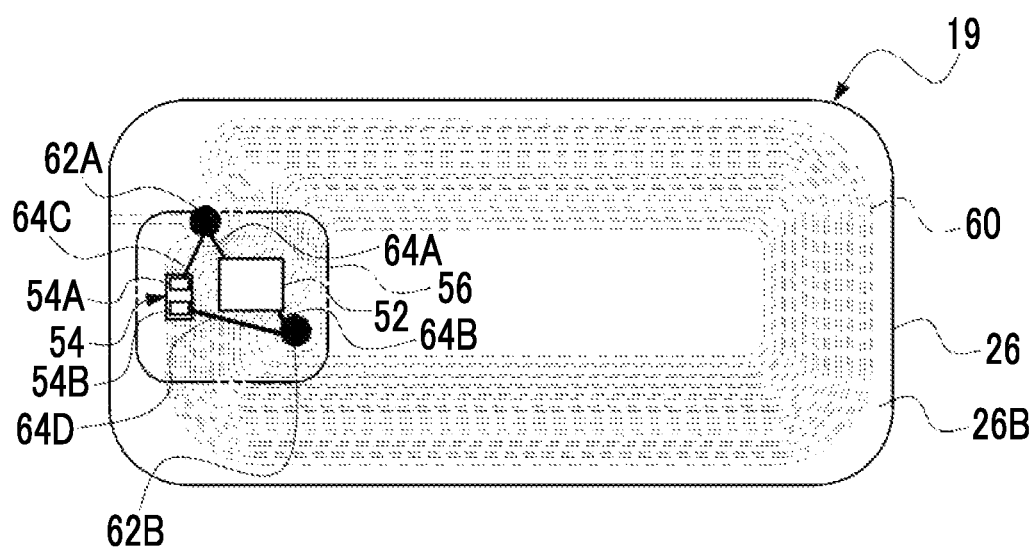
FIG. 8 is a schematic plan view showing an example of the structure of a front surface of the substrate of the cartridge memory in the magnetic tape cartridge.

As shown in FIG. 8 as an example, on the front surface 26B of the cartridge memory 19, the IC chip 52 and the capacitor 54 are electrically connected to each other using a wired connection method. Specifically, one terminal of a positive electrode terminal and a negative electrode terminal of the IC chip 52 is connected to the first conduction portion 62A through a wiring 64A, and the other terminal is connected to the second conduction portion 62B through a wiring 64B. The capacitor 54 has a pair of electrodes. In the example shown in FIG. 8, a pair of electrodes is electrodes 54A and 54B. The electrode 54A is connected to the first conduction portion 62A through a wiring 64C, and the electrode 54B is connected to the second conduction portion 62B through a wiring 64D. With this, the IC chip 52 and the capacitor 54 are connected in parallel with the coil 60.

Figure 9:
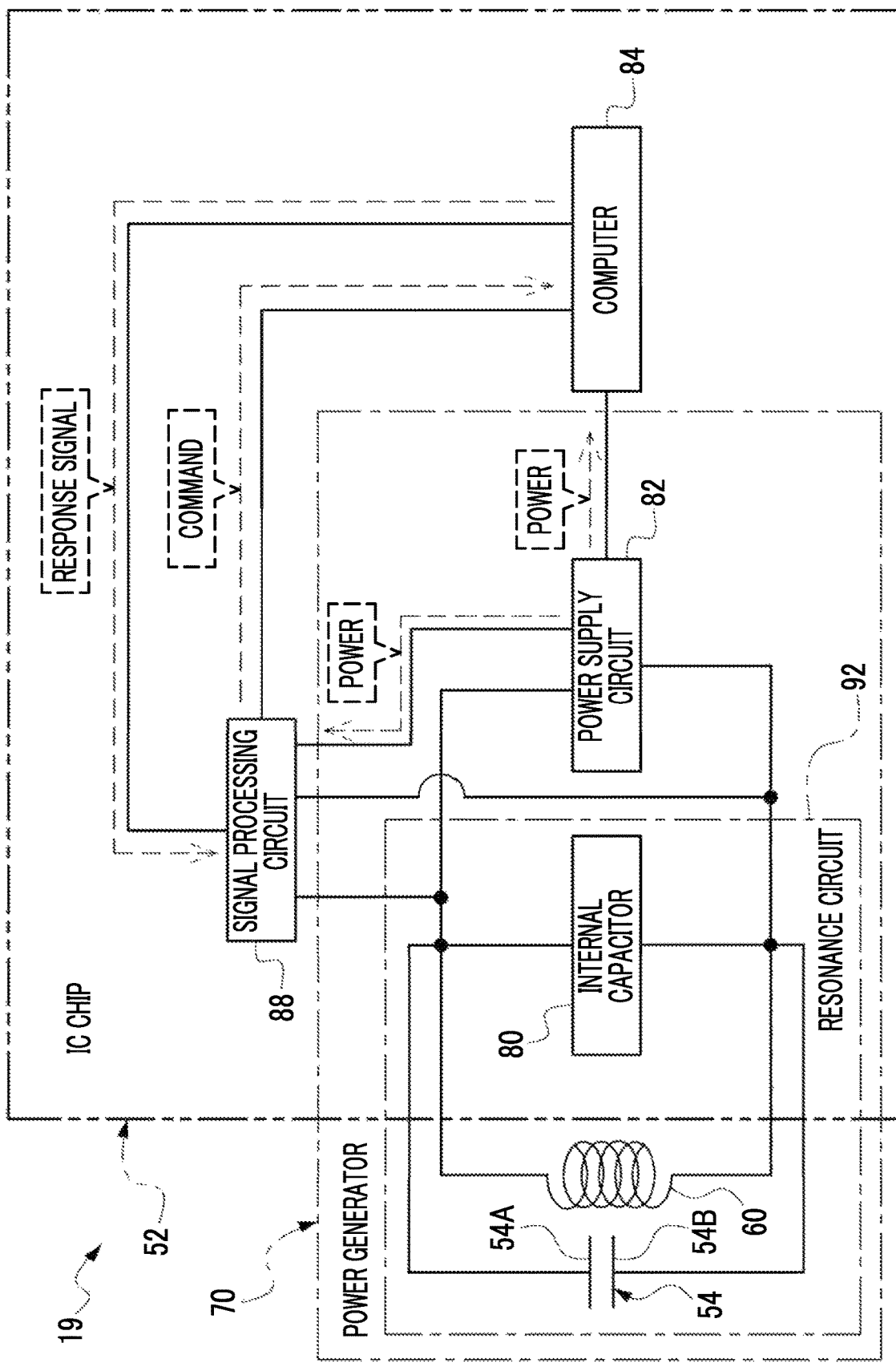
FIG. 9 is a schematic circuit diagram showing an example of the circuit configuration of the cartridge memory in the magnetic tape cartridge.

As shown in FIG. 9 as an example, the IC chip 52 comprises an internal capacitor 80, a power supply circuit 82, a computer 84, and a signal processing circuit 88. Here, as an example of the IC chip 52, a general-purpose IC chip that is usable for purposes other than the magnetic tape cartridge 10 is used. The general-purpose IC chip is merely an example, and an IC chip of a type that is used only for the magnetic tape cartridge 10 may be employed.

The cartridge memory 19 comprises a power generator 70. The power generator 70 generates power with application of the magnetic field MF from the noncontact reading and writing device 50 to the coil 60. Specifically, the power generator 70 generates alternating-current power using a resonance circuit 92, converts the generated alternating-current power into direct-current power, and outputs the direct-current power.

The power generator 70 has the resonance circuit 92 and the power supply circuit 82. The resonance circuit 92 comprises the capacitor 54, the coil 60, and the internal capacitor 80. The internal capacitor 80 is a capacitor incorporated in the IC chip 52, and the power supply circuit 82 is also a circuit incorporated in the IC chip 52. The internal capacitor 80 is connected in parallel with the coil 60.

The capacitor 54 is a capacitor externally attached to the IC chip 52. The IC chip 52 is a general-use IC chip that is intrinsically usable for purposes different from the magnetic tape cartridge 10. For this reason, the capacitance of the internal capacitor 80 is not enough to realize a resonance frequency required for the cartridge memory 19 used in the magnetic tape cartridge 10. Accordingly, in the cartridge memory 19, the capacitor 54 is post-attached to the IC chip 52 as a capacitor having a capacitance value necessary in making the resonance circuit 92 resonate at a resonance frequency determined in advance with the application of the magnetic field MF. The resonance frequency determined in advance is the same frequency as the frequency of the magnetic field MF, and here, 13.56 MHz is employed. The capacitance of the capacitor 54 is determined based on a measured value of the capacitance of the internal capacitor 80.

The resonance circuit 92 generates an alternating-current power by generating a resonance phenomenon at the resonance frequency determined in advance using the induced current induced by the coil 60 with the magnetic field MF passing through the coil 60 and outputs the generated alternating-current power to the power supply circuit 82.

The power supply circuit 82 has a rectifier circuit, a smoothing circuit, and the like. The rectifier circuit is a full-wave rectifier circuit having a plurality of diodes. The full-wave rectifier circuit is merely an example, and a half-wave rectifier circuit may be used. The smoothing circuit includes a capacitor and a resistor. The power supply circuit 82 converts the alternating-current power input from the resonance circuit 92 into direct-current power and supplies the converted direct-current power (hereinafter, simply referred to as "power") to various drive elements in the IC chip 52. Examples of various drive elements include the computer 84 and the signal processing circuit 88. In this way, power is supplied to various drive elements in the IC chip 52 by the power generator 70, whereby the IC chip 52 operates using power generated by the power generator 70.

The computer 84 is an example of a "computer that is applied to a noncontact storage medium" according to the technique of the present disclosure, and controls the entire cartridge memory 19.

The signal processing circuit 88 is connected to the resonance circuit 92. The signal processing circuit 88 has a decoding circuit (not shown) and an encoding circuit (not shown). The decoding circuit of the signal processing circuit 88 extracts and decodes the command from the magnetic field MF received by the coil 60 and outputs the command to the computer 84. The computer 84 outputs a response signal to the command to the signal processing circuit 88. That is, the computer 84 executes processing depending on the command input from the signal processing circuit 88 and outputs a processing result as a response signal to the signal processing circuit 88. In the signal processing circuit 88, in a case where the response signal is input from the computer 84, the encoding circuit of the signal processing circuit 88 encodes the response signal to modulate the response signal and outputs the response signal to the resonance circuit 92. The resonance circuit 92 transmits the response signal input from the encoding circuit of the signal processing circuit 88 to the noncontact reading and writing device 50 through the magnetic field MF. That is, in a case where the response signal is transmitted from the cartridge memory 19 to the noncontact reading and writing device 50, the response signal is included in the magnetic field MF. In other words, the response signal is superimposed on the magnetic field MF.

In this way, the IC chip 52 is connected to the coil 60 to be coupled to the noncontact reading and writing device 50 by electromagnetic induction through the magnetic field MF applied from the noncontact reading and writing device 50, and performs communication with the noncontact reading and writing device 50 through the magnetic field MF (see FIGS. 5 and 6). The IC chip 52 corresponds to a plurality of communication standards. Here, a plurality of communication standards indicate, for example, ISO18092, ISO14443A, ISO1443B, and ISO15693. The noncontact reading and writing device 50 has any of a plurality of communication standards. That is, while the noncontact reading and writing device 50 is not limited as being mounted only on the magnetic tape drive 30 shown in FIG. 4, a plurality of noncontact reading and writing devices 50 are also present in a manufacturing process, an inspection process, and the like, and each noncontact reading and writing device 50 has any of a plurality of communication standards.

Figure 10:
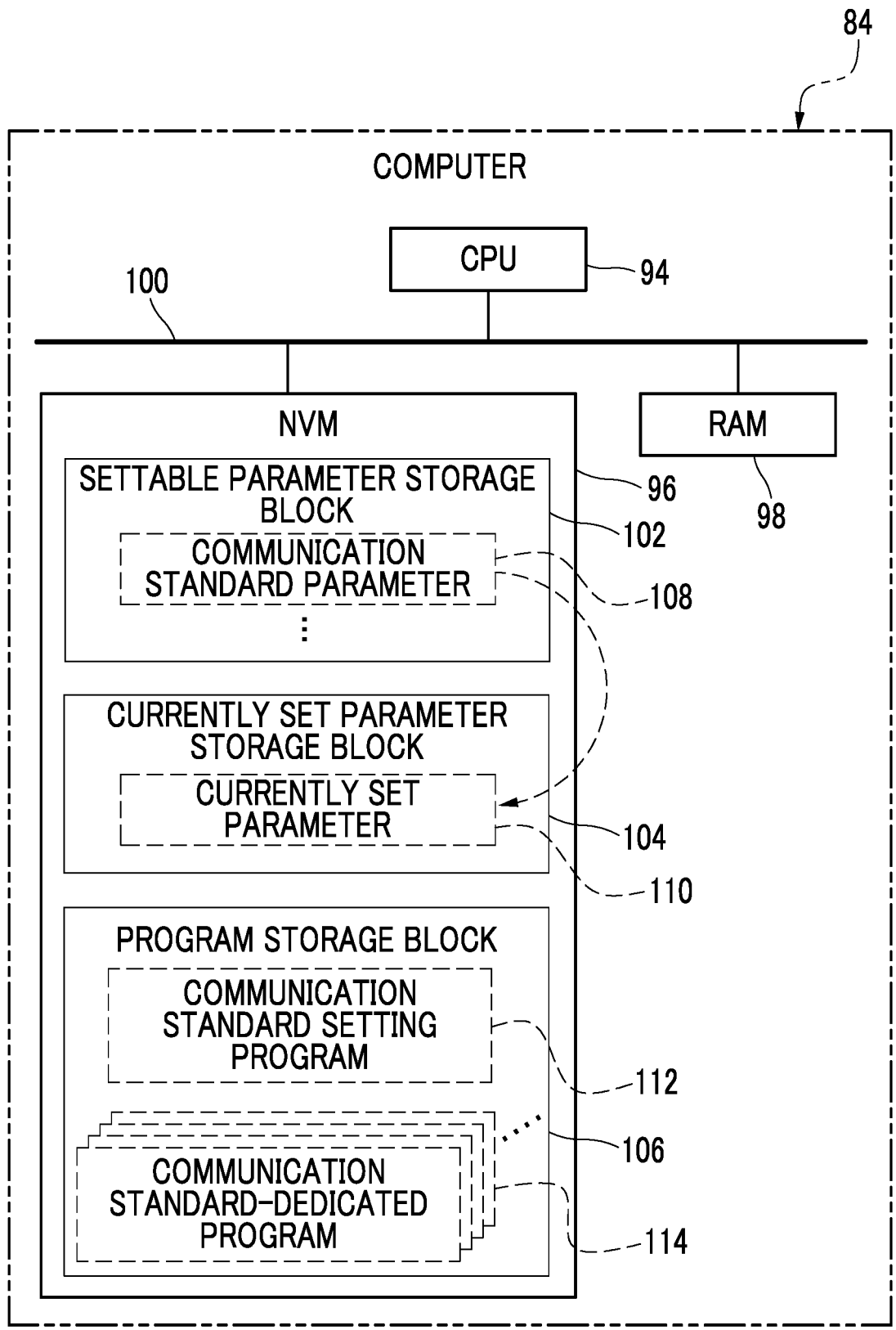
FIG. 10 is a block diagram showing an example of the hardware configuration of a computer of an IC chip mounted on the cartridge memory in the magnetic tape cartridge.

As shown in FIG. 10 as an example, the computer 84 comprises a CPU 94, an NVM 96, and a RAM 98. The CPU 94, the NVM 96, and the RAM 98 are connected to a bus 100.

The CPU 94 controls the operation of the computer 84. The NVM 96 is an example of a "memory" according to the technique of the present disclosure. An example of the NVM 96 is an EEPROM. The EEPROM is merely an example, and for example, a ferroelectric memory may be used instead of the EEPROM or any memory may be used as long as the memory is a non-volatile memory that can be mounted on the IC chip 52. The RAM 98 temporarily stores various kinds of information and is used as a work memory. An example of the RAM 98 is a DRAM or an SRAM.

The NVM 96 has a plurality of storage blocks including a settable parameter storage block 102, a currently set parameter storage block 104, and a program storage block 106. Management information (not shown) and the like are stored in the plurality of storage blocks.

A plurality of communication standard parameters 108 that are able to specify communication standards settable in the IC chip 52 are stored in the settable parameter storage block 102. Here, the communication standard parameter 108 is an example of a "parameter" according to the technique of the present disclosure. A plurality of communication standard parameters 108 are example of "communication standard information regarding a plurality of communication standards" according to the technique of the present disclosure, and the settable parameter storage block 102 is an example of a "hold region for holding communication standard information" according to the technique of the present disclosure.

The currently set parameter storage block 104 is an example of a "storage region" according to the technique of the present disclosure. A currently set parameter 110 is stored in the currently set parameter storage block 104. The currently set parameter 110 is a communication standard parameter 108 corresponding to a communication standard currently set in the IC chip 52 among a plurality of communication standard parameters 108. The currently set parameter 110 is an example of a "storage content of a memory" and "set communication standard information indicating the set communication standard" according to the technique of the present disclosure.

A communication standard setting program 112 is stored in the program storage block 106. The communication standard setting program 112 is an example of a "program" according to the technique of the present disclosure. A plurality of communication standard-dedicated programs 114 are also stored in the program storage block 106. A plurality of communication standard-dedicated programs 114 correspond to a plurality of communication standard parameters 108 on a one-to-one basis. The CPU 94 reads out the communication standard-dedicated program 114 corresponding to the currently set parameter 110 stored in the currently set parameter storage block 104 from the program storage block 106. The CPU 94 executes the program storage block 106 read out from the program storage block 106 to realize communication in a communication standard corresponding to the currently set parameter 110 stored in the currently set parameter storage block 104.

The communication standard that is specified from the currently set parameter 110 stored in the currently set parameter storage block 104 is the communication standard currently set in the IC chip 52. That is, the CPU 94 executes the communication standard-dedicated program 114 corresponding to the currently set parameter 110 stored in the currently set parameter storage block 104, whereby the IC chip 52 can perform communication with the noncontact reading and writing device 50 in the currently set communication standard through the coil 60 (FIG. 9).

Figure 11:
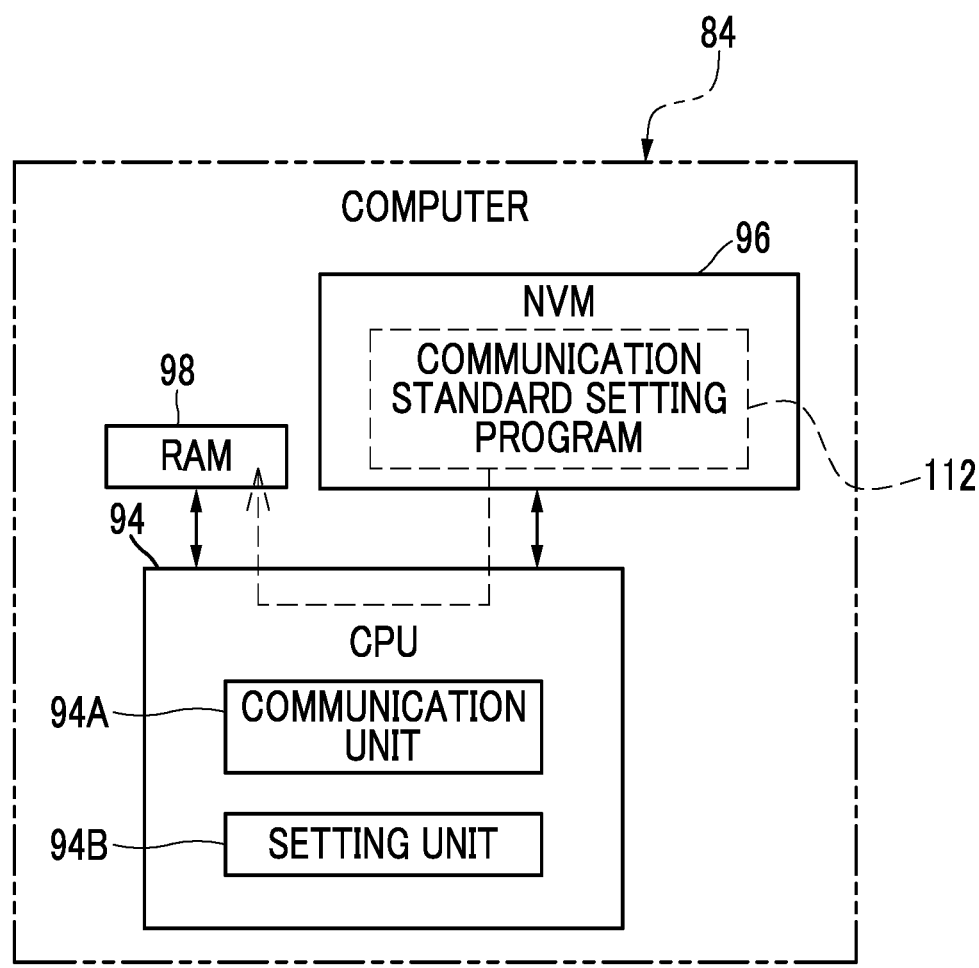
FIG. 11 is a block diagram showing an example of functions of a CPU.

As shown in FIG. 11 as an example, the CPU 94 reads out the communication standard setting program 112 from the NVM 96 and executes the read-out communication standard setting program 112 on the RAM 98. The CPU 94 operates as a communication unit 94A and a setting unit 94B following the communication standard setting program 112 that is executed on the RAM 98, to execute communication standard setting processing (see FIG. 16) described below.

Figure 12:
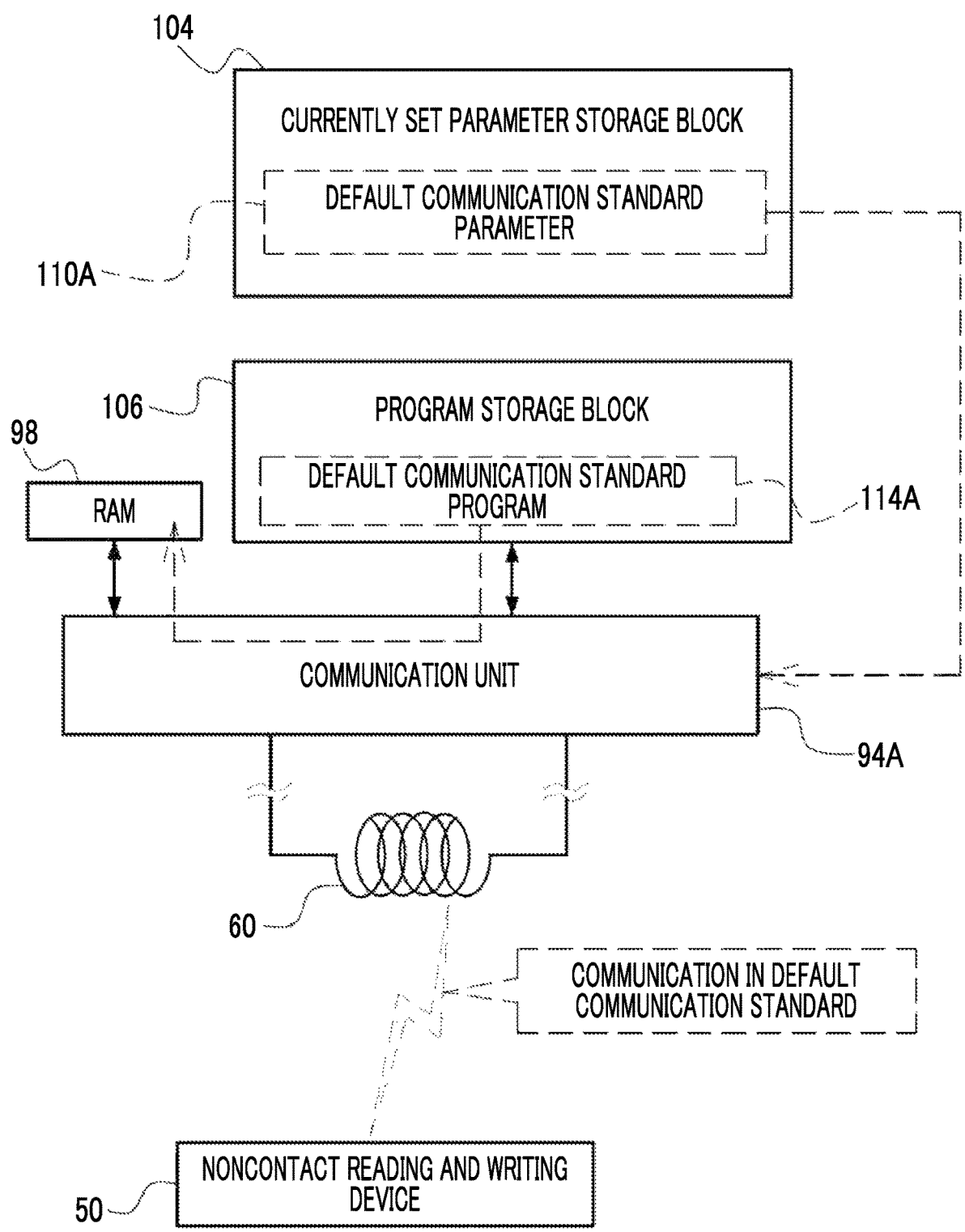
FIG. 12 is a block diagram showing an example of processing contents in a case where the cartridge memory performs communication with the noncontact reading and writing device in a default communication standard.

As shown in FIG. 12 as an example, a default communication standard program 114A as one of a plurality of communication standard-dedicated programs 114 is stored in the program storage block 106. In a case where the IC chip 52 is in an initial setting state, a default communication standard parameter 110A is stored as the currently set parameter 110 in the currently set parameter storage block 104. The default communication standard parameter 110A is a parameter that is able to specify a communication standard (hereinafter, also referred to as a "default communication standard") to be used by the IC chip 52 by default. In a case where the default communication standard parameter 104A is stored in the program storage block 106, the setting unit 94B executes, on the RAM 98, the read-out default communication standard program 114A from the program storage block 106. The setting unit 94B executes the default communication standard program 114A on the RAM 98 to perform communication with the noncontact reading and writing device 50 in the default communication standard through the coil 60. An example of the default communication standard is ISO14443A. In the present embodiment, ISO14443A is a special communication standard that is used only for changing the setting of the communication standard.

ISO14443A is merely an example of the default communication standard and the special communication standard, and the default communication standard and the special communication standard may be a communication standard, such as ISO18092, ISO1443B, or ISO15693.

Figure 13:
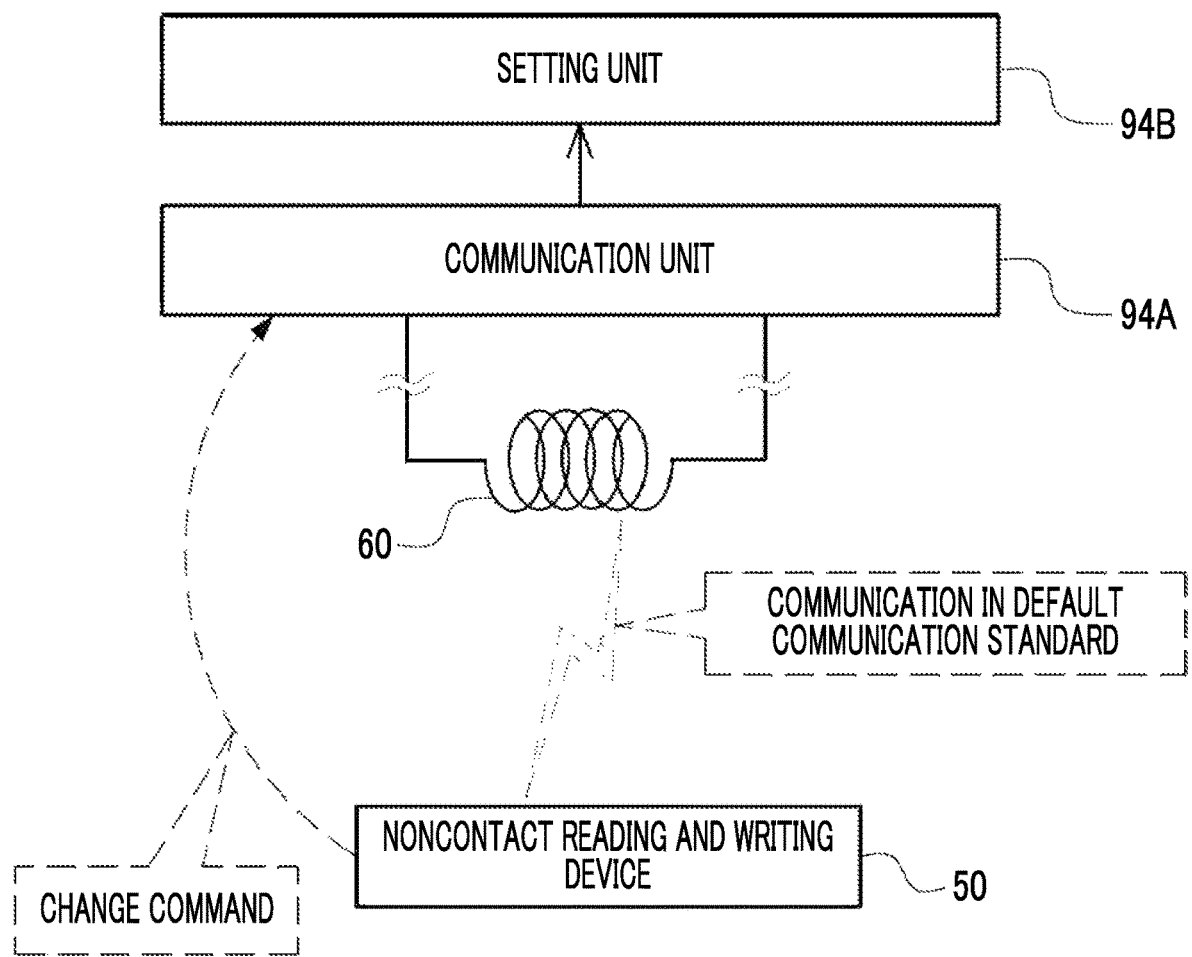
FIG. 13 is a block diagram showing an example of processing contents in a case where a communication unit performs communication with the noncontact reading and writing device in the default communication standard to receive a change command from the noncontact reading and writing device.

In a state in which any one communication standard among a plurality of communication standards is set as the default communication standard in the IC chip 52, for example, as shown in FIG. 13, in a state in which communication in the default communication standard is established between the communication unit 94A and the noncontact reading and writing device 50, the noncontact reading and writing device 50 transmits a change command to the communication unit 94A. The communication unit 94A performs communication with the noncontact reading and writing device 50 in the default communication standard to receive the change command from the noncontact reading and writing device 50.

The change command is an example of a "change instruction" and a "rewrite command for rewriting a storage content of the memory" according to the technique of the present disclosure. The change command indicates a command for instructing change of the setting of the communication standard in the IC chip 52 to a communication standard different from the default communication standard. That is, the noncontact reading and writing device 50 is an example of an "outside" according to the technique of the present disclosure, and performs communication with the communication unit 94A in the default communication standard to give a change instruction to a communication standard different from the default communication standard as a change command to the communication unit 94A.

In the present embodiment, the change command is a special command that is used only for changing the setting of the communication standard. Note that the technique of the present disclosure is not limited thereto, and a rewrite command that is used for rewriting the storage content of the NVM 96 for a general purpose may be used for the change instruction of the setting of the communication standard.

In a case where the change command is given from the noncontact reading and writing device 50 to the communication unit 94A, the setting unit 94B changes the setting of the communication standard from the default communication standard to the communication standard depending on the change command among a plurality of communication standards as a new communication standard and fixes the new communication standard.

Figure 14:
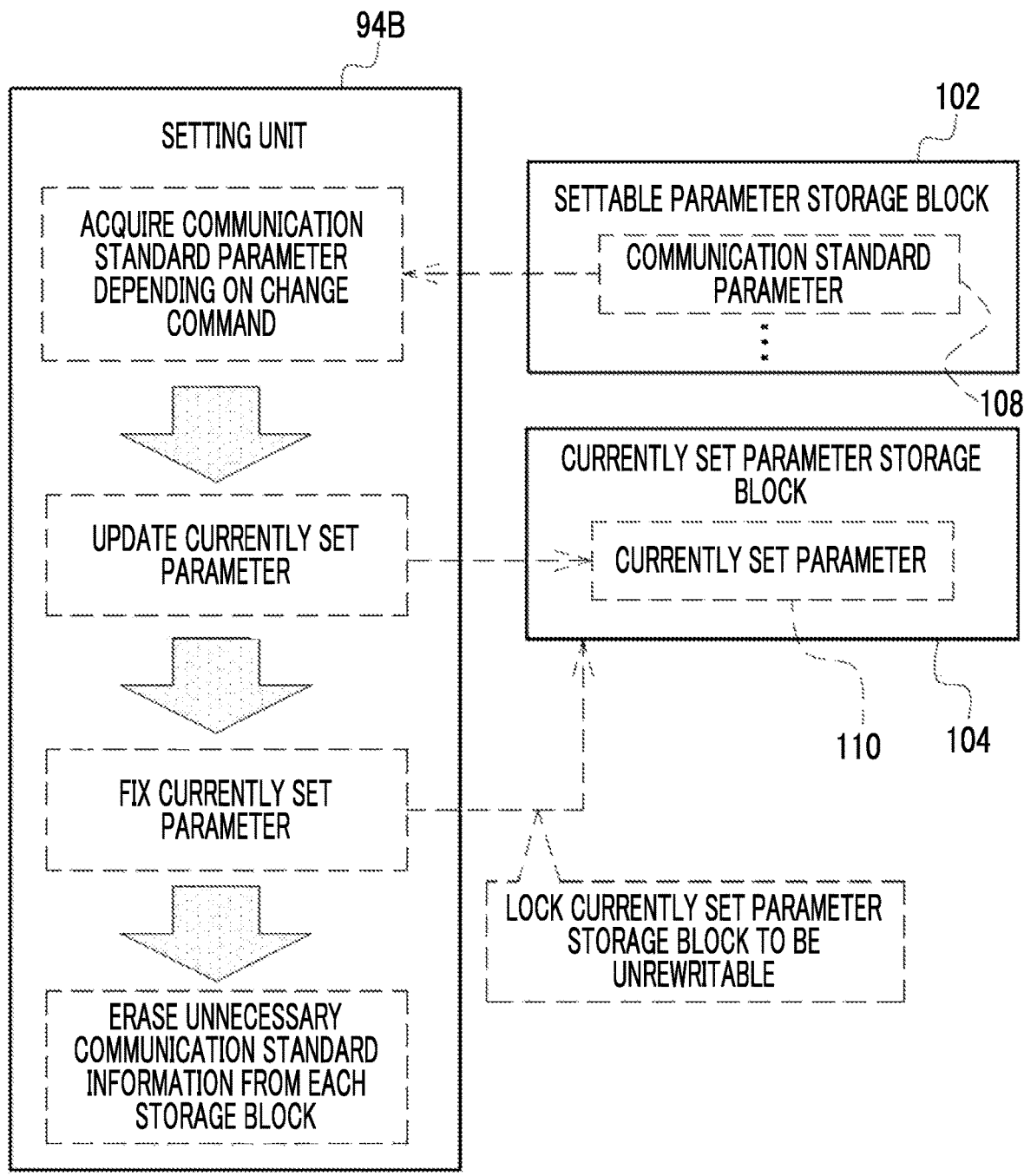
FIG. 14 is a block diagram showing an example of processing contents in a case of changing a setting of a communication standard of the IC chip from the default communication standard to a communication standard corresponding to the change command.

In this case, as shown in FIG. 14 as an example, first, the setting unit 94B acquires the communication standard parameter 108 depending on the change command given from the noncontact reading and writing device 50 to the communication unit 94A, from the settable parameter storage block 102. Next, the setting unit 94B overwrites and saves the communication standard parameter 108 acquired from the settable parameter storage block 102 in the currently set parameter storage block 104 to update the currently set parameter 110. That is, the setting unit 94B rewrites the currently set parameter 110 in the currently set parameter storage block 104 from the default communication standard parameter 110A (see FIG. 12) to the latest communication standard parameter 108 acquired from the settable parameter storage block 102 to change the setting of the communication standard. With this, the setting of the communication standard of the IC chip 52 is changed from the default communication standard to the communication standard that is specified from the latest communication standard parameter 108 acquired from the settable parameter storage block 102.

Then, the setting unit 94B fixes the currently set parameter 110 in the currently set parameter storage block 104 to fix the setting of the communication standard that is specified from the currently set parameter 110 in the currently set parameter storage block 104. That is, the setting unit 94B fixes the setting of the new communication standard under a condition that the setting of the communication standard of the IC chip 52 is changed from the default communication standard to the new communication standard. Specifically, the setting of the communication standard that is specified from the latest communication standard parameter 108 is fixed under a condition that the currently set parameter 110 in the currently set parameter storage block 104 is updated from the default communication standard parameter 110A to the latest communication standard parameter 108 acquired from the settable parameter storage block 102.

Here, "fixing the currently set parameter 110" means fixing the currently set parameter 110 in an unrewritable state. An example of a method of fixing the currently set parameter 110 in the currently set parameter storage block 104 is a method of locking the entire currently set parameter storage block 104 to be unrewritable.

The setting unit 94B erases unnecessary communication standard information from each storage block under a condition that the setting of the new communication standard is fixed. Specifically, the setting unit 94B erases a plurality of communication standard parameters 108 from the settable parameter storage block 102 and erases the communication standard-dedicated programs 114 other than the communication standard-dedicated program 114 corresponding to the communication standard specified from the currently set parameter 110, from the program storage block 106 (see FIG. 10).

Figure 15:
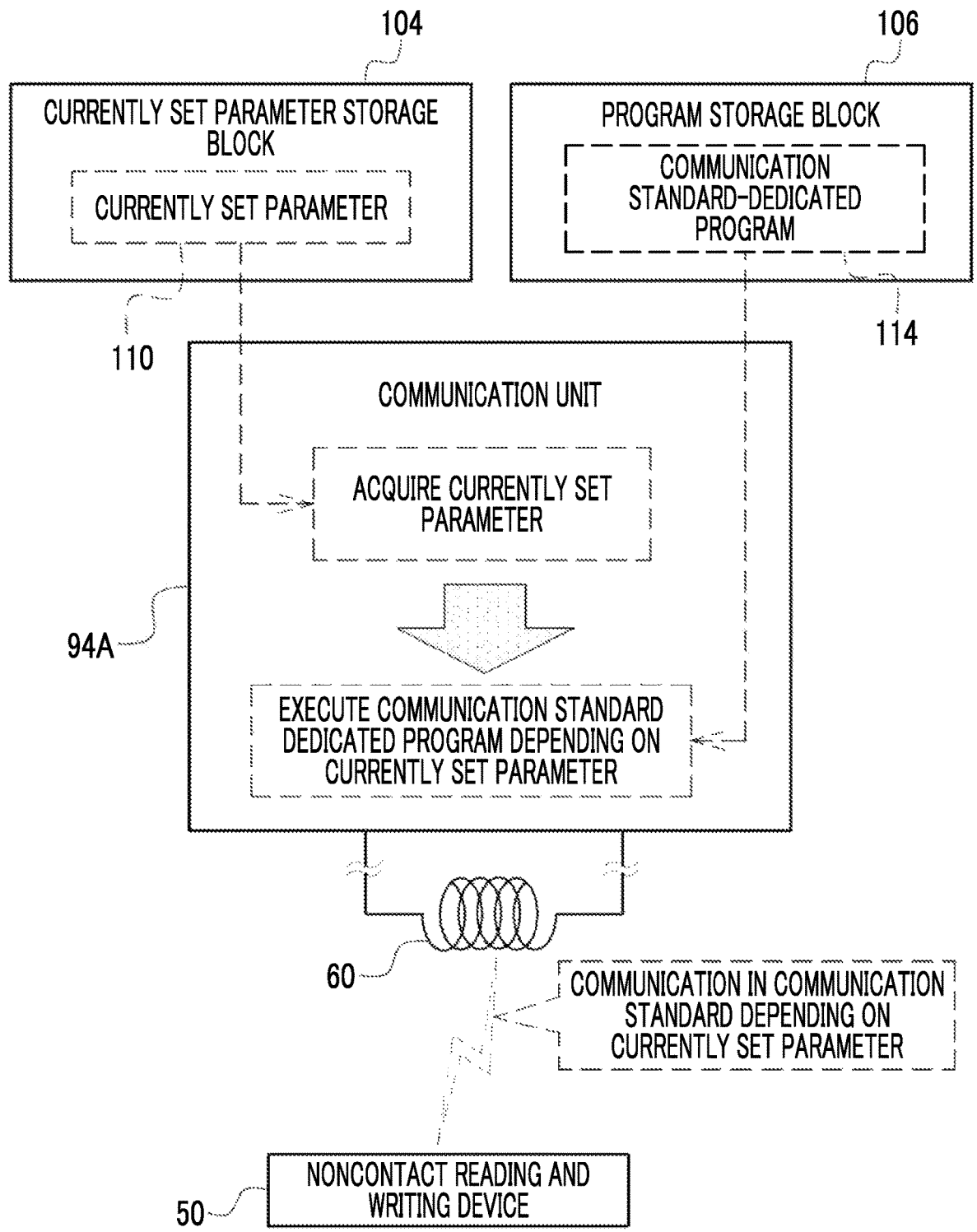
FIG. 15 is a block diagram showing an example of processing contents of the communication unit in a case where the setting of the communication standard of the IC chip is changed from the default communication standard to the communication standard corresponding to the change command.

As shown in FIG. 15 as an example, the communication unit 94A acquires the currently set parameter 110 from the currently set parameter storage block 104. Then, the communication unit 94A reads out the communication standard-dedicated program 114 corresponding to the currently set parameter 110 acquired from the currently set parameter storage block 104, from the program storage block 106 and executes the read-out communication standard-dedicated program 114. The setting unit 94B executes the communication standard-dedicated program 114 corresponding to the currently set parameter 110 to communicate with the noncontact reading and writing device 50 in the communication standard corresponding to the currently set parameter 110 through the coil 60.

Next, the operations of a cartridge memory 19 according to the embodiment will be described referring to FIG. 16.

Figure 16:
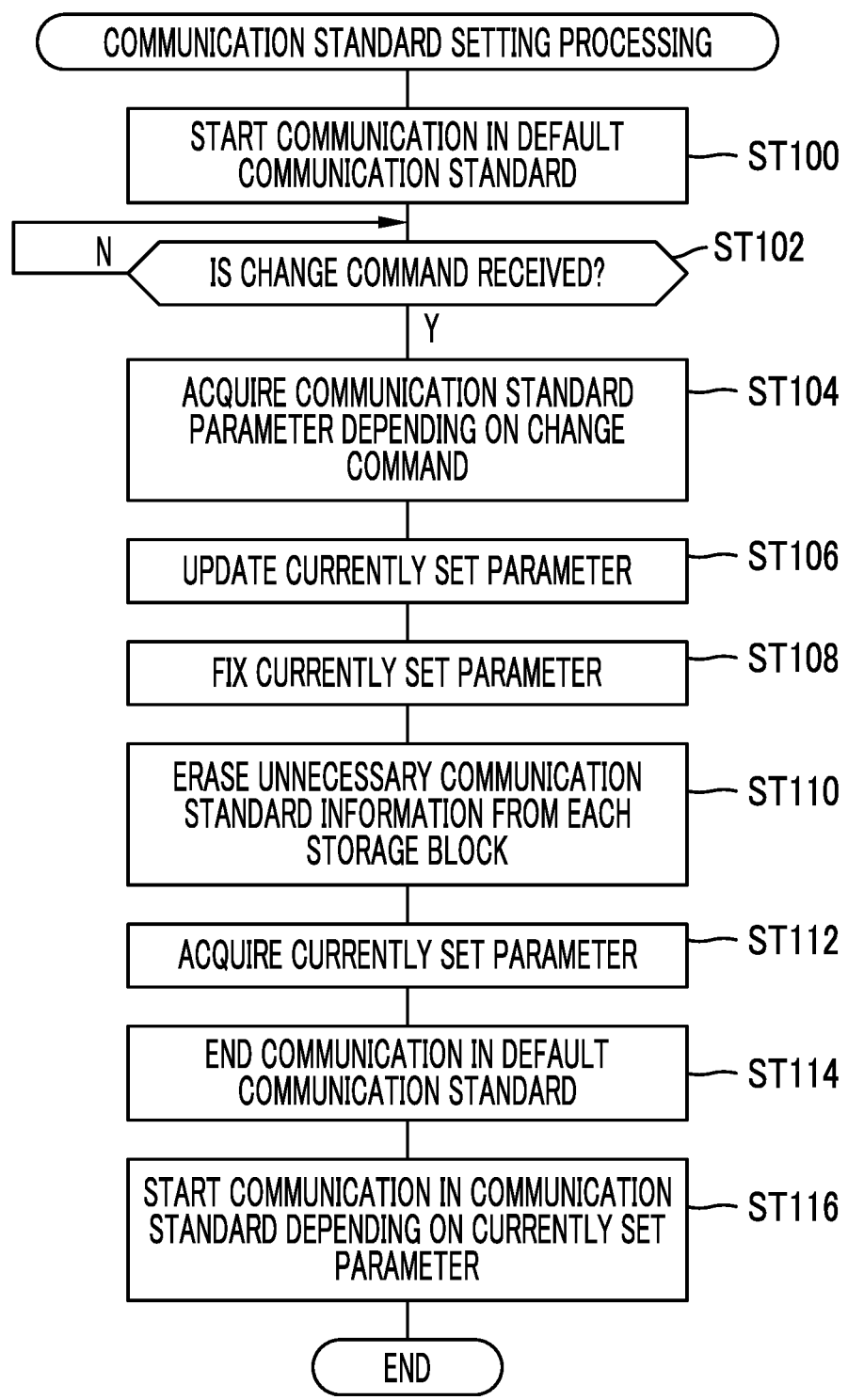
FIG. 16 is a flowchart illustrating an example of a flow of communication standard setting processing.

FIG. 16 shows an example of a flow of communication standard setting processing that is executed by the CPU 94 in a manufacturing process of the magnetic tape cartridge 10. The flow of the communication standard setting processing shown in FIG. 16 is an example of a "method for operating a noncontact storage medium" according to the technique of the present disclosure.

Here, although a form example where the communication standard setting processing is executed by the CPU 94 in the manufacturing process of the magnetic tape cartridge 10 has been described, the technique of the present disclosure is not limited thereto. For example, the communication standard setting processing may be executed by the CPU 94 in a work stage by the vendor of the magnetic tape cartridge 10, such as a stage where magnetic tape cartridge 10 is inspected or a stage where the magnetic tape cartridge 10 is shipped, or the communication standard setting processing may be executed by the CPU 94 after the magnetic tape cartridge 10 is loaded into the magnetic tape drive 30. Hereinafter, for convenience of description, description will be provided on a premise that the default communication standard parameter 110A is already stored as the currently set parameter 110 in the currently set parameter storage block 104.

In the communication standard setting processing shown in FIG. 16, first, in Step ST100, the communication unit 94A executes the default communication standard program 114A to start communication with the noncontact reading and writing device 50 in the default communication standard through the coil 60.

In next Step ST102, the communication unit 94A determines whether or not the change command from the noncontact reading and writing device 50 is received by the coil 60. In Step ST102, in a case where the change command from the noncontact reading and writing device 50 is not received by the coil 60, determination is made to be negative, and the determination in Step ST102 is performed again. In Step ST102, in a case where the change command from the noncontact reading and writing device 50 is received by the coil 60, determination is made to be affirmative, and the communication standard setting processing proceeds from Step ST102 to Step ST104.

In Step ST104, the setting unit 94B acquires the communication standard parameter 108 depending on the change command received by the coil 60 in Step ST102, from the settable parameter storage block 102.

In next Step ST106, the setting unit 94B changes the currently set parameter 110 stored in the currently set parameter storage block 104 from the default communication standard parameter 110A to the communication standard parameter 108 acquired in Step ST104 to update the currently set parameter 110.

In next Step ST108, the setting unit 94B locks the currently set parameter storage block 104 to be unrewritable to fix the currently set parameter 110 in the currently set parameter storage block 104.

In next Step ST110, the setting unit 94B erases a plurality of communication standard parameters 108 and the communication standard-dedicated programs 114 other than the communication standard-dedicated program 114 corresponding to the communication standard specified from the currently set parameter 110, as unnecessary communication standard information from the NVM 96.

In next Step ST112, the setting unit 94B acquires the currently set parameter 110 from the currently set parameter storage block 104.

In next Step ST114, the setting unit 94B ends communication in the default communication standard that is performed with the noncontact reading and writing device 50.

In next Step ST116, the setting unit 94B executes the communication standard-dedicated program 114 corresponding to the currently set parameter 110 stored in the currently set parameter storage block 104 to start communication with the noncontact reading and writing device 50 in the communication standard corresponding to the currently set parameter 110 through the coil 60.

As described above, in the cartridge memory 19, the IC chip 52 corresponds to a plurality of communication standards. Therefore, according to this configuration, it is possible to allow the cartridge memory 19 mounted in the magnetic tape cartridge 10 to perform noncontact communication with the noncontact reading and writing device 50 in a large number of communication standards, compared to a case where the IC chip of the cartridge memory mounted in the magnetic tape cartridge corresponds to only one communication standard.

In the cartridge memory 19, while the noncontact reading and writing device 50 is not limited as being mounted only on the magnetic tape drive 30 shown in FIG. 4, a plurality of noncontact reading and writing devices 50 are also present in the manufacturing process, the inspection process, and the like, and each noncontact reading and writing device 50 has any of a plurality of communication standards. Therefore, according to this configuration, even though the noncontact reading and writing device 50 has any communication standard among a plurality of communication standards, it is possible to realize noncontact communication between the cartridge memory 19 and the noncontact reading and writing device 50.

In the cartridge memory 19, in a case where the change command is given from the noncontact reading and writing device 50, the IC chip 52 changes the setting of the communication standard from the default communication standard to the communication standard depending on the change command as the new communication standard and fixes the new communication standard. Therefore, according to this configuration, it is possible to restrain the communication standard changed from the default communication standard from being erroneously changed. The technique of the present disclosure is not limited to the change of the communication standard depending on the change command, and any physical switch may be provided in the IC chip 52, and in a case where the switch is turned on, the IC chip 52 may be instructed to change the communication standard. Even in this case, the same effects can be expected.

In the cartridge memory 19, the IC chip 52 performs communication with the noncontact reading and writing device 50 in the default communication standard to receive the change command from the noncontact reading and writing device 50. Therefore, according to this configuration, it is possible to allow the IC chip 52 to receive the change command without requiring labor, compared to a case where the default communication standard is not set in the IC chip 52.

In the cartridge memory 19, the special communication standard (the special communication standard that is used only for transferring the change command) that is used only for changing the setting of the communication standard is used as the default communication standard. Therefore, according to this configuration, it is possible to reduce a load on identification of a command in the IC chip, compared to a case where the change command and another command are received by the IC chip in the same communication standard.

In the cartridge memory 19, the setting of the new communication standard is fixed under the condition that the setting of the communication standard is changed from the default communication standard to the new communication standard. Therefore, according to this configuration, it is possible to restrain the communication standard changed from the default communication standard from being erroneously changed after the setting of the communication standard is changed from the default communication standard to the new communication standard.

In the cartridge memory 19, information regarding the communication standards other than the new communication standard is erased from the NVM 96 under the condition that the setting of the new communication standard is fixed. Therefore, according to this configuration, it is possible to increase the free space of the NVM 96, compared to a case where information regarding the communication standards other than the new communication standard is left in the NVM 96 even after the setting of the new communication standard is fixed.

In the above-described embodiment, although the setting of the new communication standard is fixed under the condition that the setting of the communication standard of the IC chip 52 is changed from the default communication standard to the new communication standard, the technique of the present disclosure is not limited thereto, the setting of the new communication standard may be fixed in a case where another predetermined condition is satisfied. For example, the setting of the new communication standard may be fixed in a case where a condition that a communication standard change flag indicating that the setting of the communication standard of the IC chip 52 is changed from the default communication standard to the new communication standard is set in the IC chip 52 is satisfied. In other words, since the setting of the new communication standard is not fixed unless the communication standard change flag is not set in the IC chip 52, the setting of the communication standard can be changed following an instruction (for example, change command) given from the outside.

Figure 17:
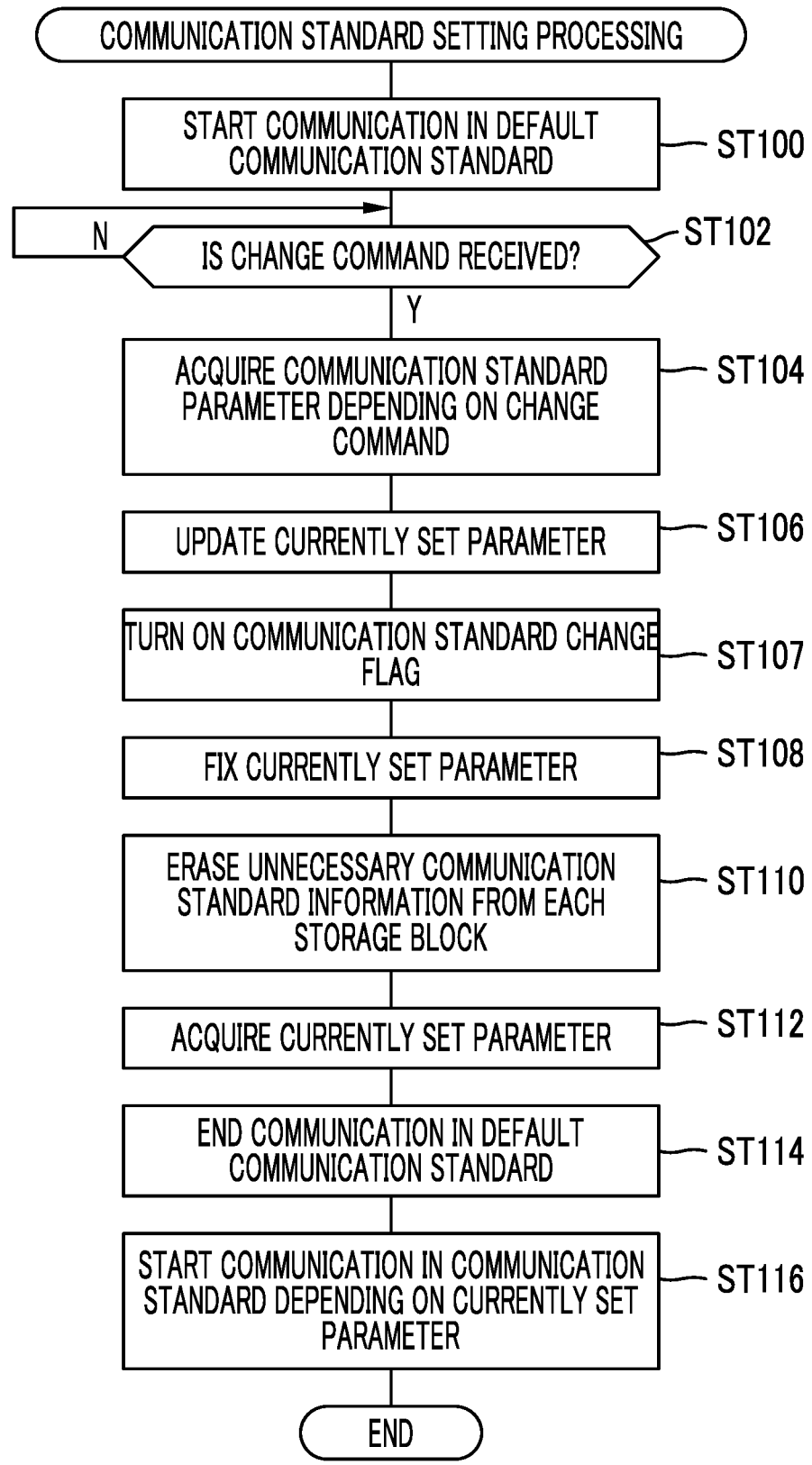
FIG. 17 is a flowchart illustrating a first modification example of a flow of communication standard setting processing.

In this case, for example, communication standard setting processing shown in FIG. 17 is executed by the CPU 94. A flowchart shown in FIG. 17 is different from the flowchart shown in FIG. 16 in that Step ST107 is provided between Step ST106 and Step ST108. For this reason, here, the step different from the flowchart shown in FIG. 16 will be described.

In Step ST107 of the communication standard setting processing shown in FIG. 17, the setting unit 94B turns on the communication standard change flag. Here, turning on the communication standard change flag means, for example, setting the communication standard change flag in the NVM 96.

A timing at which the communication standard change flag is set may be, for example, a timing when a predetermined time (for example, several seconds) has elapsed after the processing of Step ST106 is executed or may be a timing at which any condition is further satisfied after the processing of Step ST106 is executed.

Here, a first example of any condition is a condition that the level of power for driving the IC chip 52 reaches a predetermined level (for example, a level determined in advance as the level of power capable of stably driving the IC chip 52). A second example of any condition may be a condition that, in a case where a response signal indicating that the communication standard is changed is transmitted from the IC chip 52 to the noncontact reading and writing device 50, and the noncontact reading and writing device 50 receives the response signal from the IC chip 52, a flag setting instruction command for instructing the setting of the communication standard change flag is transmitted from the noncontact reading and writing device 50, and the flag setting instruction command is received by the setting unit 94B.

Only in a case where the communication standard change flag is set in the NVM 96 in this way, in Step ST108, the setting unit 94B fixes the currently set parameter 110. In other words, the currently set parameter 110 is not fixed unless the communication standard change flag is set in the NVM 96.

Therefore, the currently set parameter 110 is fixed under a condition that the communication standard change flag is set, whereby it is possible to fix the currently set parameter 110 at a predetermined timing after the currently set parameter 110 is updated.

In the example shown in FIG. 17, although a form example where the communication standard change flag is set under the condition that the setting of the communication standard of the IC chip 52 is changed from the default communication standard to the new communication standard, and the setting of the new communication standard is fixed under the condition that the communication standard change flag is set has been described, the technique of the present disclosure is not limited thereto. For example, the setting of the new communication standard may be set in a case where a condition that a specific step completion flag indicating that a specific step (for example, a final step in the manufacturing process) among a plurality of steps included in the manufacturing process of the magnetic tape cartridge 10 is completed is set in the IC chip 52 is satisfied.

Figure 18:
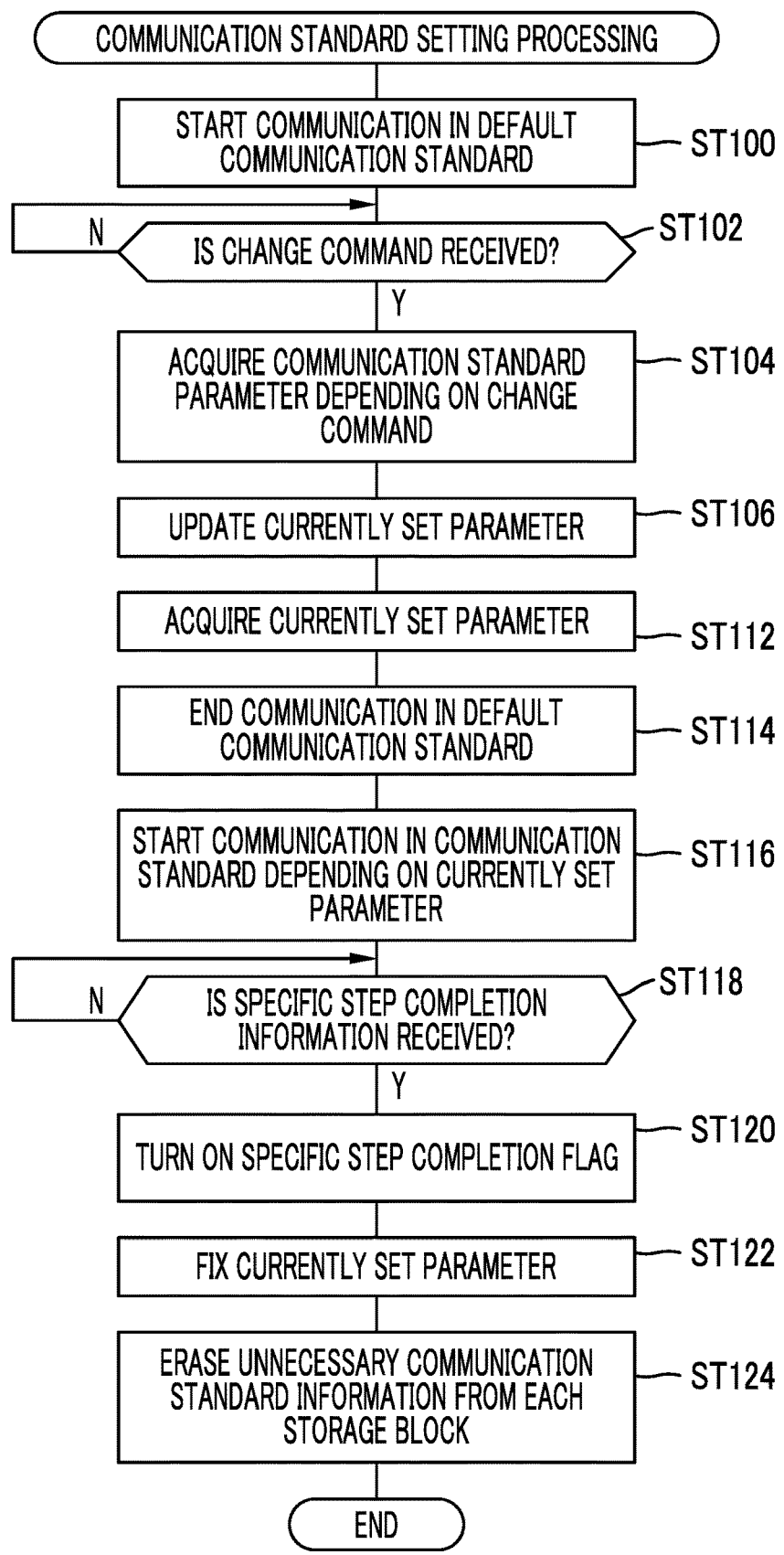
FIG. 18 is a flowchart illustrating a second modification example of a flow of communication standard setting processing.

In this case, for example, communication standard setting processing shown in FIG. 18 is executed by the CPU 94. A flowchart shown in FIG. 18 is different from the flowchart shown in FIG. 17 in that Steps ST107 to ST110 are not provided, and Steps ST118 to ST124 are provided after Step ST116. For this reason, here, the steps different from the flowchart shown in FIG. 17 will be described.

In Step ST118 of the communication standard setting processing shown in FIG. 18, the communication unit 94A determines whether or not specific step completion information indicating that the specific step is completed is received by the coil 60. The specific step completion information is transmitted, for example, from the noncontact reading and writing device 50 to the IC chip 52. In Step ST118, in a case where the specific step completion information is not received by the coil 60, determination is made to be negative, and the determination in Step ST118 is performed again. In Step ST118, in a case where the specific step completion information is received by the coil 60, determination is made to be affirmative, and the communication standard setting processing proceeds to Step ST120.

In Step ST120, the setting unit 94B turns on the specific step completion flag. Here, turning on the specific step completion flag means, for example, setting the specific step completion flag in the NVM 96.

In next Step ST122, the setting unit 94B executes the same processing as the processing of Step ST108 shown in FIGS. 16 and 17, and in next Step ST124, the setting unit 94B executes the same processing as the processing of Step ST110 shown in FIGS. 16 and 17. After the processing of Step ST124 is executed, the communication standard setting processing shown in FIG. 18 ends.

According to the example shown in FIG. 18, only in a case where the specific step completion flag is set in the NVM 96, the currently set parameter 110 is fixed by the setting unit 94B. In other words, the currently set parameter 110 is not fixed unless the specific step completion flag is set in the NVM 96.

Therefore, the currently set parameter 110 is fixed under the condition that the specific step completion flag is set, whereby it is possible to fix the currently set parameter 110 at a predetermined timing after the specific step is completed. In other words, since the currently set parameter 110 is not fixed unless the specific step is completed, the communication standard can be further changed in the meanwhile.

In the above-described embodiment, although a form example (see Step ST110) where unnecessary communication standard information is erased from each storage block has been described, the technique of the present disclosure is not limited thereto, only a part (for example, at least one communication standard parameter in the settable parameter storage block 102) of unnecessary communication standard information may be erased or unnecessary communication standard information may not be erased.

In the above-described embodiment, although a form example where the communication standard setting program 112 is stored in the NVM 96 has been described, the technique of the present disclosure is not limited thereto. For example, as shown in FIG. 19, the communication standard setting program 112 may be stored in a storage medium 200.

The storage medium 200 is a non-transitory storage medium. An example of the storage medium 200 is any portable storage medium, such as an SSD or a USB memory. The communication standard setting program 112 that is stored in the storage medium 200 is installed on the computer 84. The CPU 94 executes the communication standard setting processing following the communication standard setting program 112. In an example shown in FIG. 19, the CPU 94 is a single CPU, but may be a plurality of CPUs.

The communication standard setting program 112 may be stored in a storage device of another computer, a server apparatus, or the like connected to the computer 84 through a communication network (not shown), and the communication standard setting program 112 may be downloaded depending on a request from the cartridge memory 19 and may be installed on the computer 84.

Figure 19:
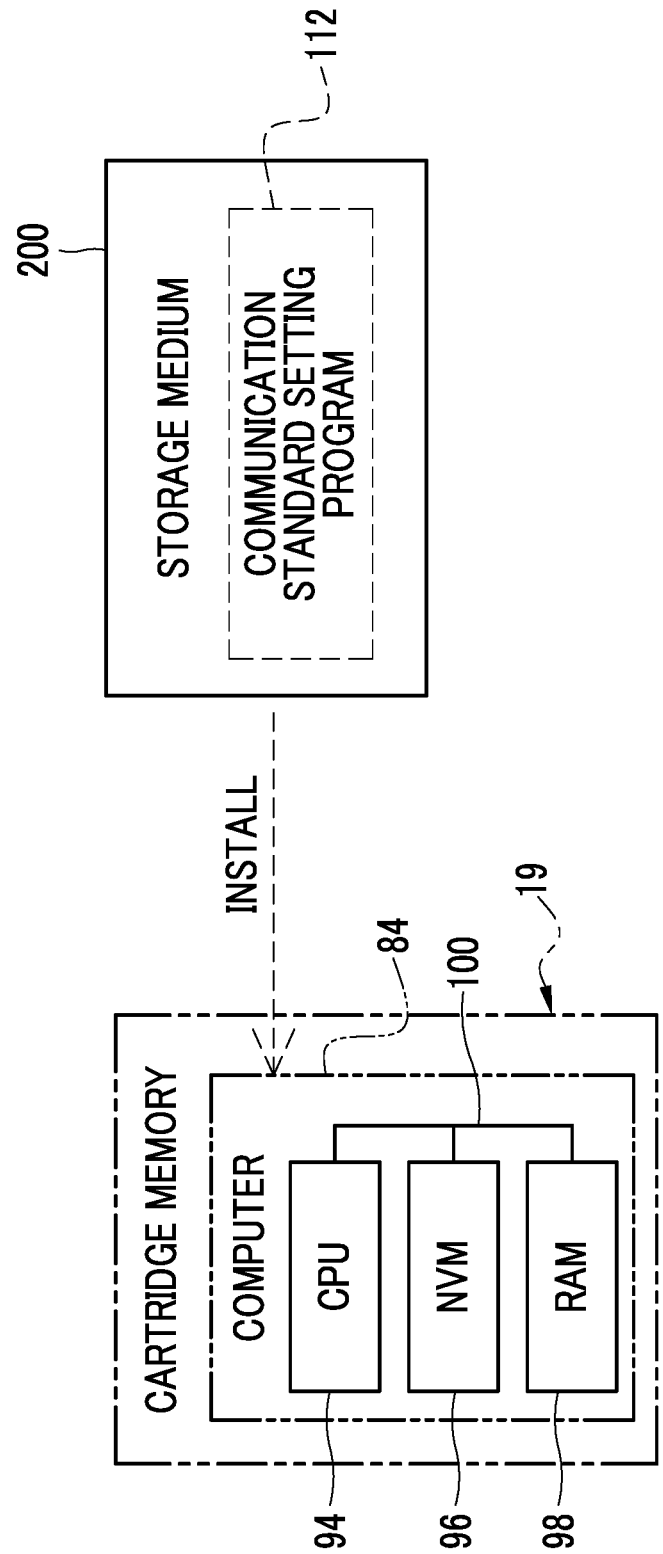
FIG. 19 is a block diagram showing an example of an aspect in which a communication standard setting program is installed on a computer from a storage medium storing the communication standard setting program.

In the example shown in FIG. 19, although the computer 84 has been illustrated, the technique of the present disclosure is not limited thereto, and a device including an ASIC, an FPGA, or a PLD may be applied instead of the computer 84. Alternatively, a combination of a hardware configuration and a software configuration may be used instead of the computer 84.

As a hardware resource that executes the communication standard setting processing, various processors described below can be used. Examples of the processors include a CPU that is a general-use processor executing software, that is, a program to function as a hardware resource that executes the communication standard setting processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor uses the memory to execute the communication standard setting processing.

The hardware resource that executes the communication standard setting processing may be configured of one of various processors or may be configured of a combination of two or more processors (for example, a combination of a plurality of FPGAs or a combination of a CPU and an FPGA) of the same type or different types. The hardware resource that executes the communication standard setting processing may be one processor.

As an example where the hardware resource is configured of one processor, first, there is a form in which one processor is configured of a combination of one or more CPUs and software, and the processor functions as the hardware resource executing the communication standard setting processing. Second, as represented by SoC or the like, there is a form in which a processor that realizes the function of the entire system including a plurality of hardware resources executing the communication standard setting processing with one IC chip is used. In this way, the communication standard setting processing is realized using one or more of various processors described above as the hardware resource.

In addition, as the hardware structures of various processors, more specifically, an electric circuit into which circuit elements, such as semiconductor elements, are combined can be used. The above-described communication standard setting processing is merely an example. Accordingly, it is needless to say that unnecessary steps may be deleted, new steps may be added, or a processing order may be changed without departing from the gist.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A noncontact storage medium that is mounted in a magnetic tape cartridge, the noncontact storage medium comprising:
    an IC chip that is connected to an antenna to be coupled to a communication destination by electromagnetic induction through a magnetic field applied from the communication destination, and performs communication with the communication destination through the magnetic field,
    wherein the IC chip corresponds to a plurality of communication standards,
    wherein any one communication standard among the plurality of communication standards is set in the IC chip as a default communication standard, and
    wherein in a case where a change instruction to a communication standard different from the default communication standard is given from an outside, the IC chip changes a setting of the communication standard from the default communication standard to a communication standard depending on the change instruction among the plurality of communication standards as a new communication standard and fixes the new communication standard.

2. The noncontact storage medium according to claim 1, wherein the communication destination is any of a plurality of communication devices, and
the plurality of communication devices have any of the plurality of communication standards.

3. The noncontact storage medium according to claim 1, wherein the change instruction is a change command for instructing change to the communication standard different from the default communication standard.

4. The noncontact storage medium according to claim 3, wherein the outside is the communication destination, and
the IC chip performs the communication in the default communication standard to receive the change command from the communication destination.

5. The noncontact storage medium according to claim 4, wherein the IC chip is able to communicate with the communication destination in a special communication standard that is a communication standard different from the plurality of communication standards and is used only for changing the setting of the communication standard, and communicates with the communication destination in the special communication standard to receive the change command.

6. The noncontact storage medium according to claim 3, wherein the IC chip fixes a setting of the new communication standard under a condition that the setting of the communication standard is changed from the default communication standard to the new communication standard.

7. The noncontact storage medium according to claim 3, wherein the IC chip changes the setting of the communication standard from the default communication standard to the new communication standard and fixes a setting of the new communication standard in a case where a predetermined condition is satisfied.

8. The noncontact storage medium according to claim 7, wherein the IC chip has a storage region where a parameter that is able to specify a set communication standard among the plurality of communication standards is stored, and
the predetermined condition includes a condition that the parameter in the storage region is updated from the default communication standard to the parameter of the new communication standard.

9. The noncontact storage medium according to claim 7, wherein the predetermined condition includes a condition that a communication standard change flag indicating that the setting of the communication standard is changed from the default communication standard to the new communication standard is set in the IC chip.

10. The noncontact storage medium according to claim 7, wherein the predetermined condition includes a condition that a specific step completion flag indicating that a specific step among a plurality of steps included in a manufacturing process of the magnetic tape cartridge is completed is set in the IC chip.

11. The noncontact storage medium according to claim 3, wherein the change command is a special command that is used only for changing the setting of the communication standard.

12. The noncontact storage medium according to claim 3, wherein the IC chip has a memory,
the change command is a rewrite command for rewriting a storage content of the memory,
the storage content includes set communication standard information indicating the set communication standard, and
the set communication standard information is rewritten depending on the rewrite command, so that the setting of the communication standard is changed.

13. The noncontact storage medium according to claim 3, wherein the IC chip has a hold region for holding communication standard information regarding the plurality of communication standards, and erases information regarding a communication standard other than the new communication standard from the communication standard information in the hold region under a condition that a setting of the new communication standard is fixed.

14. A magnetic tape cartridge comprising:
a magnetic tape, and
a noncontact storage medium that is mounted in the magnetic tape cartridge, the noncontact storage medium comprising:
an IC chip that is connected to an antenna to be coupled to a communication destination by electromagnetic induction through a magnetic field applied from the communication destination, and performs communication with the communication destination through the magnetic field,
wherein the IC chip corresponds to a plurality of communication standards,
wherein any one communication standard among the plurality of communication standards is set in the IC chip as a default communication standard,
wherein in a case where a change instruction to a communication standard different from the default communication standard is given from an outside, the IC chip changes a setting of the communication standard from the default communication standard to a communication standard depending on the change instruction among the plurality of communication standards as a new communication standard and fixes the new communication standard, and
wherein the noncontact storage medium stores information regarding the magnetic tape.

15. A method for operating a noncontact storage medium that is mounted in a magnetic tape cartridge,
in which the noncontact storage medium includes
an IC chip that is connected to an antenna to be coupled to a communication destination by electromagnetic induction through a magnetic field applied from the communication destination, and performs communication with the communication destination through the magnetic field,
the IC chip corresponds to a plurality of communication standards, and
any one communication standard among the plurality of communication standards is set in the IC chip as a default communication standard,
the method comprising:
with the IC chip, changing, in a case where a change command to a communication standard different from the default communication standard is given from an outside, a setting of the communication standard from the default communication standard to a communication standard depending on the change command among the plurality of communication standards as a new communication standard; and
fixing the new communication standard.

16. A non-transitory computer-readable storage medium storing a program executable by a computer, which is applied to a noncontact storage medium mounted in a magnetic tape cartridge, to perform a process,
- in which the noncontact storage medium includes
- an IC chip that is connected to an antenna to be coupled to a communication destination by electromagnetic induction through a magnetic field applied from the communication destination, and performs communication with the communication destination through the magnetic field,
- the IC chip corresponds to a plurality of communication standards, and
- any one communication standard among the plurality of communication standards is set in the IC chip as a default communication standard,
- the process comprising:
- with the IC chip, changing, in a case where a change command to a communication standard different from the default communication standard is given from an outside, a setting of the communication standard from the default communication standard to a communication standard depending on the change command among the plurality of communication standards as a new communication standard; and
- fixing the new communication standard.

* * * * *